United States Patent
Kawai et al.

(10) Patent No.: US 9,168,841 B2
(45) Date of Patent: Oct. 27, 2015

(54) METHOD OF RECEIVING CHARGE, METHOD OF CONTROLLING CHARGE, CHARGE CONTROL UNIT AND CHARGING EQUIPMENT

(75) Inventors: Shoji Kawai, Inchinomiya (JP); Tomoyuki Marui, Owariasahi (JP); Masami Takahashi, Nagoya (JP); Kazumi Rissen, Ebina (JP); Takafumi Ebara, Yokohama (JP); Kei Yonezawa, Yokohama (JP); Yoshihito Nasu, Hitachinaka (JP)

(73) Assignee: HITACHI, LTD., Tokyo (JP)

( * ) Notice: Subject to any disclaimer, the term of this patent is extended or adjusted under 35 U.S.C. 154(b) by 753 days.

(21) Appl. No.: 13/110,312

(22) Filed: May 18, 2011

(65) Prior Publication Data

US 2011/0285345 A1 Nov. 24, 2011

(30) Foreign Application Priority Data

May 19, 2010 (JP) .................................. 2010-115420
Apr. 6, 2011 (JP) .................................. 2011-084682

(51) Int. Cl.
*H02J 7/00* (2006.01)
*G05D 5/00* (2006.01)
(Continued)

(52) U.S. Cl.
CPC ........... *B60L 11/1824* (2013.01); *B60L 11/185* (2013.01); *B60L 11/1825* (2013.01); *B60L 11/1838* (2013.01); *B60L 11/1844* (2013.01);
(Continued)

(58) Field of Classification Search
CPC .............................. Y02T 90/12; Y02T 90/121

USPC .................. 320/104, 109; 700/291, 295, 296; 701/22
See application file for complete search history.

(56) References Cited

U.S. PATENT DOCUMENTS 7,839,117 B2 * 11/2010 Elder et al. ..................... 320/104
7,869,576 B1 * 1/2011 Rodkey et al. .................. 379/37
(Continued)

FOREIGN PATENT DOCUMENTS

JP 07-115732 5/1995
JP 2006-20438 1/2006
(Continued)

OTHER PUBLICATIONS

Office Action issued in Japanese Patent Application No. 2011-084682 on Jun. 24, 2014.
(Continued)

*Primary Examiner* — Richard Isla Rodas
*Assistant Examiner* — Michael Dibenedetto
(74) *Attorney, Agent, or Firm* — Baker Botts L.L.P.

(57) ABSTRACT

Charging equipment and a charge control unit are provided, in which a plurality of devices mounted with battery can be simultaneously charged by the single charging equipment. Further, a method of controlling charge and a method of receiving charge are also provided. The charging equipment supplies electric power to the battery for charging, comprising a power output part which outputs DC power used for charging, a plurality of user operation units which can be connected with a vehicle equipped with a battery as a device mounted with battery, and the charge control unit which controls a power supply from the power output part to the user operation unit. Herein, the charge control unit distributes the electric power outputted from the power output part to supply the distributed power to the user operation unit connected with the vehicle.

20 Claims, 24 Drawing Sheets

(51) Int. Cl.
  *B60L 11/18* (2006.01)
  *H02J 7/04* (2006.01)

(52) U.S. Cl.
  CPC ............ *H02J 7/0027* (2013.01); *H02J 7/045* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y04S 10/126* (2013.01)

(56) References Cited

U.S. PATENT DOCUMENTS

| | | | |
|---|---|---|---|
| 8,111,043 B2 * | 2/2012 | Redmann | 320/109 |
| 8,154,246 B1 * | 4/2012 | Heitmann | 320/109 |
| 2009/0315512 A1 * | 12/2009 | Ichikawa et al. | 320/109 |
| 2010/0017249 A1 * | 1/2010 | Fincham et al. | 705/8 |
| 2010/0106631 A1 * | 4/2010 | Kurayama et al. | 705/34 |
| 2010/0134067 A1 * | 6/2010 | Baxter et al. | 320/109 |
| 2010/0188042 A1 * | 7/2010 | Yeh | 320/109 |
| 2010/0191585 A1 * | 7/2010 | Smith | 705/13 |
| 2011/0074350 A1 * | 3/2011 | Kocher | 320/109 |
| 2011/0099144 A1 * | 4/2011 | Levy et al. | 707/609 |
| 2011/0148353 A1 * | 6/2011 | King et al. | 320/109 |
| 2011/0175569 A1 * | 7/2011 | Austin | 320/109 |
| 2011/0266996 A1 * | 11/2011 | Sugano | 320/104 |

FOREIGN PATENT DOCUMENTS

| | | |
|---|---|---|
| JP | 2006-020438 | 1/2006 |
| JP | 2006-74867 | 3/2006 |
| JP | 2006-262570 | 9/2006 |
| JP | 2008-199752 | 8/2008 |
| JP | 2009-136109 | 6/2009 |
| JP | 2010-028913 | 2/2010 |
| JP | 2010-28913 | 2/2010 |
| JP | 2010-110044 | 5/2010 |
| JP | 2010-213502 | 9/2010 |
| JP | 2011-024334 | 2/2011 |
| JP | 5647057 B2 | 12/2014 |

OTHER PUBLICATIONS

Office Action issued in Chinese Patent Application No. 201110123711.4 on Feb. 24, 2014.

Office Action in JP2011-084682, dispatched Apr. 8, 2014, [in Japanese, 5 pgs.].

Notice of Reasons for Rejection, mailed Jul. 28, 2015, which issued during the prosecution of Japanese Patent Application No. 2014-219860, which corresponds to the present application.

* cited by examiner

FIG.9

TIMER CHARGE MANAGEMENT DB 45

| CHARGE TERMINAL No. | CHARGE COEFFICIENT α (%/kW·min) | AT APPLICATION TIME ||||| AFTER POWER CONVERSION UNIT ALLOCATION |||| RT FLAG |
|---|---|---|---|---|---|---|---|---|---|---|---|
| | | BATTERY RESIDUAL QUANTITY (%) | CHARGE RATE (%) | CONNECTING START TIME | CHARGE END TIME | | CHARGE RATE (%) | CHARGE OUTPUT CAPACITY (kW) | CHARGE START TIME | CHARGE END TIME | |
| 1 | 0.05 | 20 | 80 | 11:30 | 14:00 | | 80 | 10 | 11:30 | 13:30 | 0 |
| 2 | 0.05 | 20 | 80 | 12:00 | 17:00 | | 80 | 10 | 12:00 | 14:00 | 1 |
| 3 | 0.05 | 10 | 80 | 13:00 | 15:00 | | 80 | 20 | 13:00 | 14:10 | 1 |
| 4 | | | | | | | | | | | 0 |

FIG.10

QUICK CHARGE MANAGEMENT DB 46

| No. | CHARGE TERMINAL No. | CHARGE COEFFICIENT α (%/kW·min) | AT APPLICATION TIME ||||| AFTER POWER CONVERSION UNIT ALLOCATION |||
|---|---|---|---|---|---|---|---|---|---|---|
| | | | BATTERY RESIDUAL QUANTITY (%) | CHARGE RATE (%) | SPECIFIED CHARGE OUTPUT CAPACITY (kW) | CONNECTING START TIME | CHARGE END TIME | CHARGE RATE (%) | CHARGE OUTPUT CAPACITY (kW) | CHARGE START TIME | CHARGE END TIME |
| 1 | 4 | 0.05 | 10 | 80 | 50 | 13:30 | 14:00 | 80 | 50 | 13:30 | 14:00 |
| 2 | | | | | | | | | | | |

FIG.12

OPERATION TIME DB 48

| POWER CONVERSION UNIT | ACCUMULATION OPERATION TIME (MIN/YEAR) |
|---|---|
| A | 580 |
| B | 560 |
| C | 570 |
| D | 550 |
| E | 540 |

METHOD OF RECEIVING CHARGE, METHOD OF CONTROLLING CHARGE, CHARGE CONTROL UNIT AND CHARGING EQUIPMENT

CROSS REFERENCE TO RELATED APPLICATIONS

This application claims the foreign priority benefit under Title 35, United State Code, 119 (a)-(d) of Japanese Patent Application No. 2010-115420, filed on May 19, 2010 and No. 2011-084682, filed on Apr. 6, 2011 in the Japan Patent Office, the disclosure of which is herein incorporated by reference in its entirety.

BACKGROUND OF THE INVENTION

1. Field of the Invention

The present invention relates to a method of receiving charge, a method of controlling charge, a charge control unit and charging equipment, for charging a battery in a device mounted with battery such as an electric automobile.

2. Description of Related Art

Recently, because of an increasing concern about environmental aspects, an electric automobile and a hybrid vehicle have been widely used as a vehicle discharging less exhaust gas. Such a vehicle is equipped with a battery which supplies an electric power to a motor so that the vehicle runs by the motor as a driving source. Accordingly, when a charge amount of the battery is lowered as running the vehicle, it is needed to charge the battery at a charging station or the like placed at a corner of a street at all such times (see Japanese Laid-Open Patent Publication Nos. 2010-28913, H07-115732, 2006-20438, 2006-262570 and S54-101526).

Although a technology for quick charging has been developed, under the present circumstances, it needs a long time to charge a battery. Hereby, when a vehicle occupies a charging station, other users have to wait their turn, resulting in causing the significant inconvenience. Further, the time required for the full charging of a battery is different depending on the battery residual quantity when the charging starts. Therefore, users can not know when the vehicle during charging completes the charging, which is a factor for spoiling the convenience of the users. In order to solve such inconvenience, a technology disclosed in Japanese Laid-Open Patent Publication No. 2010-28913 has been proposed.

As shown in FIG. 30, charging equipment 81 disclosed in Japanese Laid-Open Patent Publication No. 2010-28913 comprises a charge converter device 82 which converts the voltage acquired from the system to output a predetermined DC voltage, and a plurality of user operation units 84 connecting a vehicle 83 to the charge converter device 82 when charging. The charge converter device 82 comprises a power conversion unit 85 which converts a commercial power source to a DC power source, and a switching circuit 86 which distributes the DC power outputted from the power conversion unit 85 to a specific user operation unit 84. Herein, the user operation unit 84 corresponds to a so called charge terminal, in which a power supply plug is arranged at the end of a charge cable.

When a vehicle 83 is parked at a parking lot, a power supply plug of the user operation unit 84 is connected with the inlet of the vehicle 83 for charging the battery thereof. At that time, the charge converter device 82 connects the switching circuit 86 to the user operation unit 84 which is connected with the vehicle 83, thereby to connect the power conversion unit 85 to the user operation unit 84 in use. As a result, by a DC voltage from the power conversion unit 85, a DC current flows into the vehicle 83 through the user operation unit 84 in use, to charge the battery of the vehicle 83.

Here, the charging equipment 81 disclosed in Japanese Laid-Open Patent Publication No. 2010-28913 only performs a switching operation, in which one power conversion unit 85 is connected to a user operation unit 84 by a switching circuit 86. Accordingly, only one vehicle 83 can be charged by one charge converter device 82. That is, only one-to-one charging is available. Therefore, if a vehicle 83 is being charged, other vehicles can not be charged until the vehicle 83 completes the charging. Meanwhile, when a plurality of charge converter devices 82 are provided, a plurality of vehicles may be charged. However, this is not realistic because the costs required for preparing the charge converter devices 82 increase.

SUMMARY OF THE INVENTION

An object of the present invention is to provide a method of receiving charge, a method of controlling charge, a charge control unit and charging equipment, so as to simultaneously charge a plurality of devices mounted with battery by using the single charging equipment.

In order to solve the above mentioned disadvantages, the present invention provides a charge control unit included in charging equipment which charges a battery by supplying the electric power thereto. The charging equipment comprises a power output part which outputs DC power used for charging, a plurality of user operation units which can be connected with a device mounted with battery; the device being equipped with a battery, and the charge control unit which controls a power supply from the power output part to the user operation unit. Herein, the charge control unit distributes the electric power outputted from the power output part to the user operation unit connected with the device mounted with battery.

By using the above mentioned construction, when the device mounted with battery is connected with the user operation unit in the charge equipment, the charge control unit distributes the available electric power at that time to the user operation unit as a power source, to supply the distributed electric power to the user operation unit so as to charge the battery of the device mounted with battery. Then, every time when the device mounted with battery is connected with the user operation unit, the available electric power at that time is allocated to the user operation unit, allowing the battery to be charged. Accordingly, by using the single charging equipment, the plurality of user operation units can be charged, allowing the plurality of devices mounted with battery can be charged simultaneously.

Further, in order to solve the above mentioned disadvantages, the present invention provides charging equipment which charges a battery by supplying the electric power thereto, comprising a power output part which outputs DC power used for charging, a plurality of user operation units which can be connected with a device mounted with battery; the device being equipped with a battery, and a charge control unit which controls a power supply from the power output part to the user operation unit. Herein, the charge control unit distributes the electric power outputted from the power output part to the user operation unit connected with the device mounted with battery.

Further, in order to solve the above mentioned disadvantages, the present invention provides a method of controlling charge which is performed by a charge control unit included in charging equipment. The charging equipment supplies the electric power to a battery to be charged, comprising a power output part which outputs DC power used for charging, a plurality of user operation units which can be connected with a device mounted with battery; the device being equipped with a battery, and the charge control unit which controls a power supply from the power output part to the user operation unit. Herein, the charge control unit distributes the electric power outputted from the power output part to the user operation unit connected with the device mounted with battery.

Further, in order to solve the above mentioned disadvantages, the present invention provides a method of receiving charge which is performed by a user operation unit included in charging equipment. The charging equipment supplies the electric power to a battery to be charged, comprising a power output part which outputs DC power used for charging, the plurality of user operation units each of which can be connected with a device mounted with battery; the device being equipped with a battery, and a charge control unit which controls a power supply from the power output part to the user operation unit. Herein, the charge control unit distributes the electric power outputted from the power output part to the user operation unit connected with the device mounted with battery. The method comprises steps of: (a) displaying an acceptance screen on a display part comprising a timer charge acceptance part which accepts a charge schedule defining a charge end time of the battery and a quick charge acceptance part which accepts a quick charge request requesting an immediate execution of charging with a predetermined charge output capacity of the battery, (b) receiving information on the charge schedule or the quick charge request on the acceptance screen, (c) storing the information on the charge schedule or the quick charge request received in the step (b) in a storage part, and (d) transmitting the information on the charge schedule or the quick charge request stored in the storage part into the charge control unit.

By using the above mentioned construction, the plurality of user operation units can be used for charging batteries by the single charging equipment. Accordingly, by using the plurality of the user operation units in the charging equipment capable of simultaneously charging a plurality of the devices mounted with battery, a user can easily request a timer charge or a quick charge through an acceptance screen having a timer charge acceptance part and a quick charge acceptance part displayed on a display part.

Further, in order to solve the above mentioned disadvantages, the present invention provides charging equipment which is connected with a device mounted with battery; the device being equipped with a battery, to charge the battery by supplying the electric power thereto. The charging equipment comprises a plurality of power conversion units which convert the power from the system to DC power used for charging and output the power, a plurality of user operation units each having a charge cable connected with the device mounted with battery, and charge control unit. Herein, the charge control unit determines/selects a power conversion unit to be used among the plurality of power conversion units for the user operation unit in use by connecting the charge cable to the device mounted with battery. Then, the charge control unit connects the user operation unit with the power conversion unit based on the above mentioned determination/selection, thereby to control the start timing and end timing of the power supply from the power conversion unit to the user operation unit.

By using the above mentioned construction, the plurality of power conversion units are arranged in the charging equipment. When the device mounted with battery is connected to the user operation unit, the available power conversion unit at that time is distributed to the user operation unit as a power source, to charge the battery of the device mounted with battery. That is, every time when the device mounted with battery is connected to the user operation unit, the available power conversion unit at that time is allocated to the user operation unit, to charge the battery of the device mounted with battery. Therefore, even though there is only single charging equipment, it is possible to use the plurality of user operation units for charging batteries, allowing the plurality of devices mounted with battery to be charged simultaneously.

According to the present invention, when the device mounted with battery is newly charged, the charge control unit allocates a power conversion unit which is not used at that time, to the newly charged device mounted with battery as a power source thereof.

By using the above mentioned construction, when another device mounted with battery is to be charged during the device mounted with battery is being charged, it is possible to charge another device mounted with battery without influencing the operation performance of the device mounted with battery which is being charged.

The present invention comprises a necessary electric energy means which receives necessary electric energy information on the necessary electric power for the charging, from the devices mounted with battery. Before starting the charging, the charge control unit allocates the power conversion units based on the necessary electric energy information inputted from the devices mounted with battery.

By using the above mentioned construction, before starting the charging, the necessary electric energy information required for the charging is outputted from the devices mounted with battery to the charging equipment. Then, the necessary number of the power conversion units may charge the batteries based on the necessary electric energy information. Accordingly, for example, when the charge amount of the battery is remarkably decreased, a large amount of the electric power is used for the charging, while when the charge amount of the battery is not so decreased, a small amount of the electric power is used for the charging. Therefore, it is possible to preferably charge the battery corresponding to the charge amount thereof at that time.

According to the present invention, the charge control unit dynamically changes or rearranges the connecting combination between the power conversion unit and the user operation unit depending on the charge state at that time.

By using the above mentioned construction, when a plurality of devices mounted with battery are simultaneously charged, if one power conversion unit completes the charging for a device mounted with battery, it is possible to allocate the power conversion unit to the other device mounted with battery. Accordingly, it is possible to more efficiently use the power conversion unit, resulting in the increase of the charging efficiency.

The present invention comprises a charge amount acquiring means which acquires charge amount information on batteries when the batteries are being charged. The charge control unit changes the allocation of the power conversion units depending on the charge amount of the batteries.

By using the above mentioned construction, when the batteries are being charged, the charge amount acquiring means acquires the charge amount information from the devices mounted with battery, and changes the allocation of the power conversion units corresponding to the number of the devices based on the charge amount information, to charge the batteries. Hereby, it is possible to charge the batteries by the constant current control at first, and to charge the batteries by the constant voltage control as gradually decreasing the charge current after the charge amount is sufficiently increased.

The present invention comprises a charge pattern input means which can manually set a charge pattern requested by a user through the user operation unit. The charge control unit allocates the power control units based on the charge pattern set by the user before starting the charging.

By using the above mentioned construction, the charge pattern can be set manually, which allows the battery to be charged associated with the charge pattern corresponding to the request by the user. Hereby, it is possible to provide a flexible service corresponding to a request from a user.

The present invention comprises a fault detection part which detects whether there is a fault in a power conversion unit, and a separation means which separates the power conversion unit with a fault from other power conversion units in use.

By using the above mentioned construction, when a power conversion unit goes wrong, the power conversion unit with a fault is disconnected from the use, and only other normal power conversion units without trouble are allocated to the user operation units. Hereby, the power conversion unit with a fault is not used as a power source, which may secure the normal charge operation.

According to the present invention, it is possible to simultaneously charge the plurality of devices mounted with battery by using the single charging equipment.

BRIEF DESCRIPTION OF THE DRAWINGS

FIG. 9 is a diagram showing a data structure of the timer charge control DB.

FIG. 10 is a diagram showing a data structure of the quick charge control DB.

FIG. 12 is a diagram showing a data structure of the operation time DB.

FIG. 13A is a diagram showing vehicles for charging and the content of the charging. FIG. 13B is a diagram showing vehicles for charging are connected to the charging equipment. FIG. 13C is a diagram showing the allocation result of the power conversion units when three vehicles are connected thereto in order. FIG. 13D is a diagram showing the allocation result of the power conversion units when first three vehicles are connected thereto in order, and then another vehicle is additionally connected.

DETAILED DESCRIPTION OF THE PREFERRED EMBODIMENT

First Embodiment

Next, a first embodiment of the present invention will be explained in reference to the attached drawings of FIGS. 1 to 6.

Figure 1:
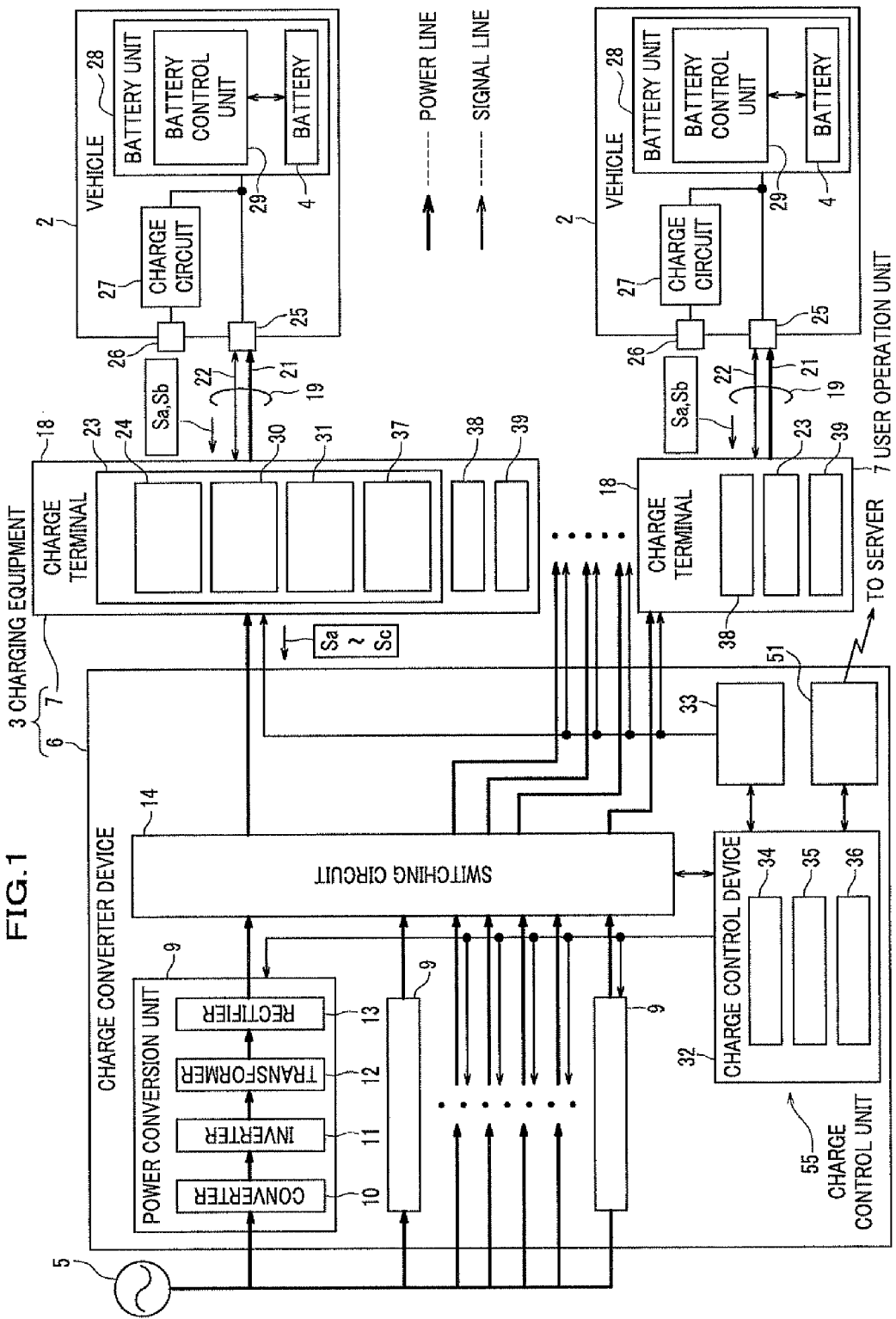
FIG. 1 is a block diagram showing the charging equipment in a first embodiment of the present invention.
Figure 2:
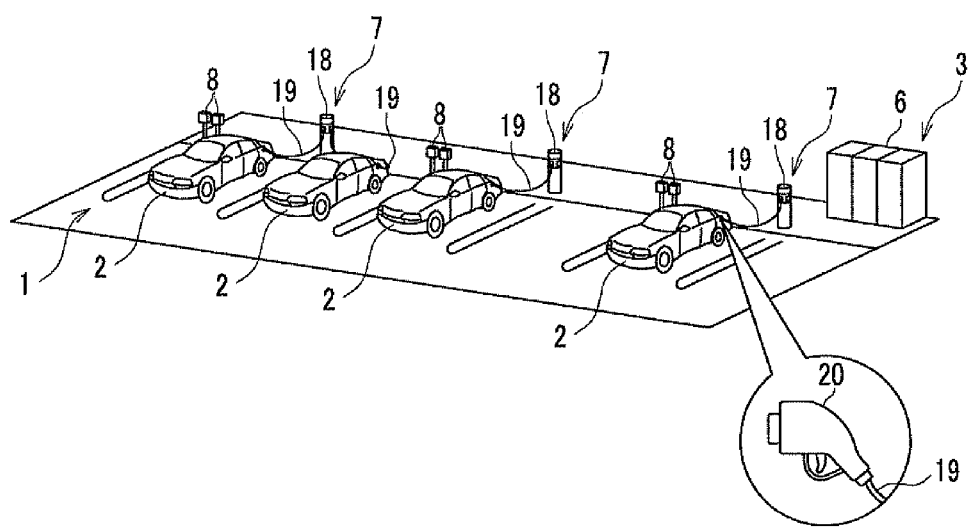
FIG. 2 is an exemplary diagram showing a state of using the charging equipment.

As shown in FIG. 2, in a parking lot 1, charging equipment 3 (or charging station) is placed, which can charge a parking electric automobile or a hybrid vehicle (hereinafter, referred to vehicle 2). The charging equipment 3 of the present embodiment is high speed charging equipment which supplies a high DC voltage such as DC 500V to the vehicle 2 for charging a battery 4 (see FIG. 1) of the vehicle 2 in a short time. Herein, the vehicle 2 corresponds to a device mounted with battery.

The charging equipment 3 comprises a charge converter device 6 which converts an AC power voltage obtained from a system power supply 5 such as a commercial power source to a DC power voltage and outputs the converted voltage for charging, and a user operation unit 7 which is connected with the vehicle 2 by a user when charging. In the parking lot 1, a parking mater 8 is also provided for measuring a parking time of a vehicle. Herein, the system power supply 5 corresponds to the system described hereinbefore.

As shown in FIG. 1, the charge converter device 6 comprises a plurality of power conversion units 9 which convert the AC power of the system power supply 5 into the DC current/voltage suitable for charging. The power conversion unit 9 converts the DC voltage of the system power supply 5 by a converter 10 into the DC voltage, and steps up the converted DC voltage to the AC voltage by an inverter 11. Then, the step-up AC voltage is converted to the DC voltage suitable for charging by a transformer 12 and a rectifier 13. Herein, each power conversion unit 9 is a small sized power source having, for example, a supply power of 10 kW, a rated current of 25 A, and a rated voltage of 400 to 500V.

Figure 3:
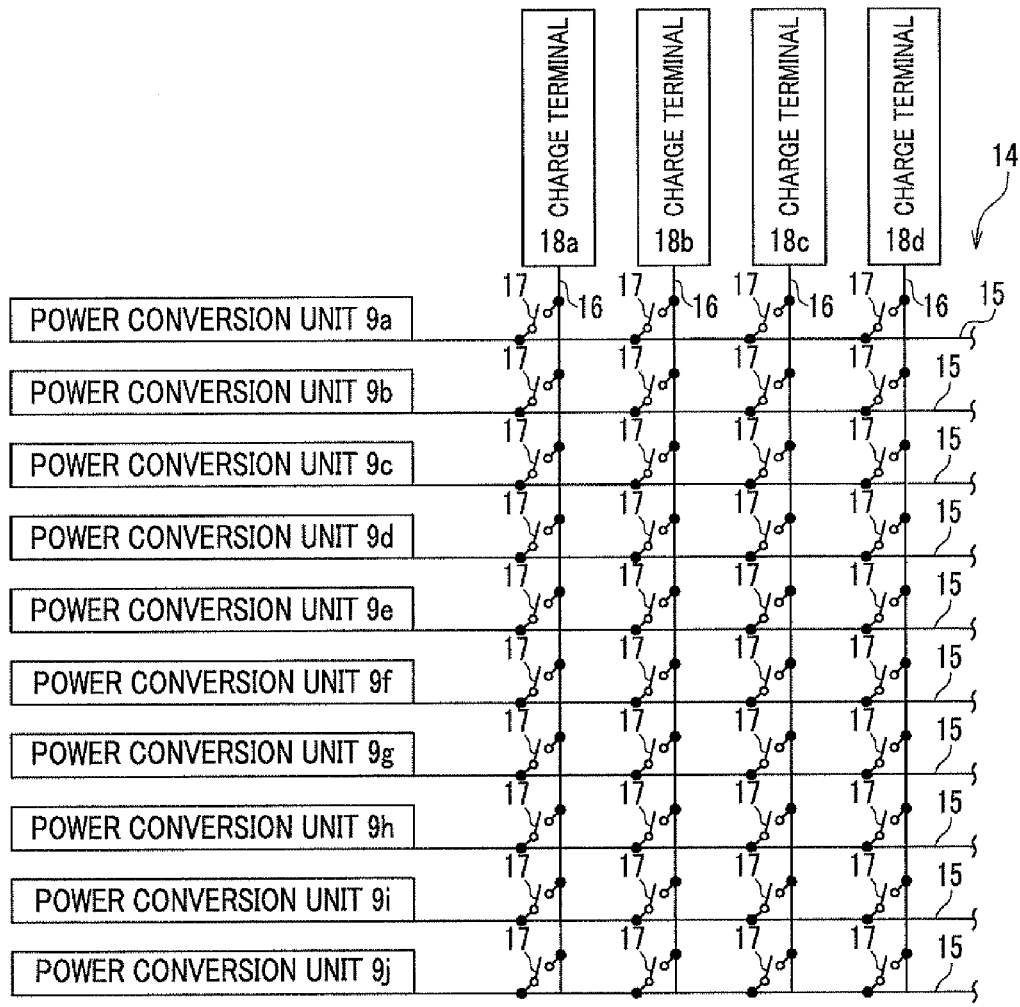
FIG. 3 is a circuit diagram of a switching circuit.

The charge converter device 6 includes a switching circuit 14 which changes a connecting combination (or connecting relationship) between the power conversion units 9 and the user operation units 7. As shown in FIG. 3, the switching circuit 14 includes circuits each having a switch 17 at the place where a generating line 15 extending from each power conversion unit 9 intersects a generating line 16 extending from each user operation unit 7 (or charge terminal 18). By setting which power conversion unit 9 is connected to a user operation unit 7 through the switches 17, the power conversion unit 9 is allocated to a desired user operation unit 7. Herein, a charge control unit 55 is constructed by the switching circuit 14.

As shown in FIGS. 1 and 2, the user operation unit 7 comprises the charge terminal 18 arranged in the parking lot 1, a charge cable 19 extending from the charge terminal 18, and a power supply plug 20 attached at the end of the charge cable 19. As shown in FIG. 1, the charge cable 19 has a power line 21 which is a transmission path of the electric power, and a signal line 22 which is a transmission path of various signals. For the communication of the signal line 22, for example, CAN (Controller Area Network) is used.

The charge terminal 18 includes a terminal controller 23 which totally controls the charge terminal 18. The terminal controller 23 includes a charge execution processing unit 24 which manages the charge operation in the charge terminal 18. When the charge execution processing unit 24 detects that the charge cable 19 is connected to the vehicle 2, the charge execution processing unit 24 supplies the DC power from the charge converter device 6 to the vehicle 2 through the power line 21, to charge the battery 4. Further, when full charging notice is inputted from the vehicle 2, the charge execution processing unit 24 transmits the full charging notice to the charge converter device 6, to stop the charging.

As shown in FIG. 1, the vehicle 2 has a plug insertion opening for quick charge 25 and a plug insertion opening for normal charge 26. The plug insertion opening for quick charge 25 is connected with the charge cable 19 of the charge terminal 18, to supply electric power such as DC 500V power through the charge cable 19. Further, the plug insertion opening for normal charge 26 is connected with, for example, a home charge cable (not shown), to input AC power of AC 100V or 200V supplied from a home power supply into the vehicle 2. Herein, the AC power of the home power supply is converted to DC power by a charge circuit 27 in the vehicle 2, to supply the converted power to the battery 4.

The vehicle 2 is equipped with a battery unit 28 which supplies electric power to a motor (not shown) as a vehicle drive source. The battery unit 28 is a so called battery pack. The battery unit 28 includes the battery 4 comprising a plurality of cells, and a battery control unit 29 which manages the charge operation at the side of the vehicle 2. As the battery 4, for example, a battery may be used comprising 100 cells with 3.6V placed side by side and having the rated voltage of 360V.

The battery control unit 29 outputs necessary electric energy information Sa to the charge terminal 18 through the signal line 22 when starting the charging, so as to obtain a necessary electric energy for the charging. The necessary electric energy information Sa includes information on the necessary electric energy, for example, 20 kW or 50 kW corresponding to the free capacity of the battery 4. Further, the battery control unit 29 always monitors the residual quantity of the battery during the charging. As a result of the monitoring, the battery control unit 29 outputs the charge amount information Sb to the charge terminal 18 through the signal line 22. Herein, the charge amount as mentioned above means the electric energy remaining in the battery 4 at that time.

The terminal controller 23 comprises a battery information acquisition part 30 which acquires various signals from the vehicle 2 through the signal line 22, and a battery information transfer part 31 which outputs various information acquired by the battery information acquisition part 30 into the charge converter device 6. The terminal controller 23 acquires the various information outputted from the battery control unit 29 by the battery information acquisition part 30, and outputs the information into the charge converter device 6 by the battery information transfer part 31. Herein, the battery information acquisition part 30 and the battery information transfer part 31 construct a necessary electric energy acquisition means and a charge amount acquisition means.

The charge converter device 6 includes a charge control device 32 which totally controls the charge converter device 6. The charge control device 32 allocates a power supply only to the power conversion unit 9 used for the charging among a plurality of power conversion units 9. The charge control device 32 is connected to each charge terminal 18 through a vehicle communication control part 33 equipped with the charge converter device 6. The charge control device 32 acquires the necessary electric energy information Sa and the charge amount information Sb from each charge terminal 18 through the vehicle communication control part 33. The vehicle communication control part 33 manages the communication between the charge converter device 6 and the plurality of charge terminals 18. Herein, the vehicle communication control part 33 constructs the necessary electric energy acquisition means and the charge amount acquisition means.

The charge control device 32 comprises a charge operation control part 34 which sets the connecting combination between the power conversion unit 9 and the user operation unit 7 into the optimal pattern corresponding to the necessary electric energy. The charge operation control part 34 appropriately sets the connecting combination between the power conversion unit 9 and the user operation unit 7 (or charge terminal 18) by changing the connecting pattern of the switches 17 in the switching circuit 14. Further, the charge operation control part 34 dynamically changes the connecting combination between the power conversion unit 9 and the user operation unit 7 corresponding to various notice from the vehicle 2. Herein, the charge operation control part 34 constructs the charge control unit 55.

Before stating the charging, the charge operation control part 34 grasps the necessary electric energy for charging the battery 4, that is, what kW of the electric energy is needed for the charging, based on the necessary electric energy information Sa acquired from the vehicle 2. Then, the charge operation control part 34 connects the needed number of the power conversion units 9 capable of supplying the necessary electric energy, with the user operation unit 7 by changing the switching state in the switching circuit 14, thereby to conduct the charging.

Figure 4:
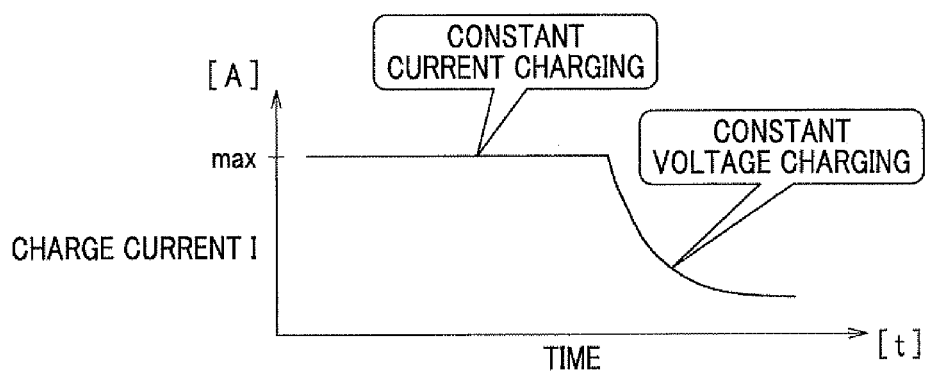
FIG. 4 is a graphic diagram showing a control sequence of charging.

Further, during the charging, the charge operation control part 34 successively acquires the charge amount information Sb from the vehicle 2 and dynamically changes the connecting combination between the power conversion unit 9 and the user operation unit 7 corresponding to the charge amount of the battery 4. That is, as shown in FIG. 4, at the early stage of the charging, the power conversion unit 9 which can satisfy the request from the vehicle 2 is connected to the user operation unit 7, to conduct the constant current charging with a high charge current I. Then, when the charge amount is satisfied to some extent, the power conversion unit 9 is gradually cut off to gradually decrease the constant current, thereby to conduct the constant voltage charging.

The charge control device 32 includes a fault detection part 35 which detects a fault of the power conversion unit 9. When the fault detection part 35 detects that the output is "0" or decreased even though the power conversion unit 9 is operated, the fault detection part 35 decides that the power conversion unit 9 is out of order. Herein, the fault detection part 35 corresponds to a fault detection means.

Further, the charge control device 32 includes a separation part of unit 36 which separates the power conversion unit 9 with a fault from the use. When the fault of the power conversion unit 9 is detected by the fault detection part 35, the separation part of unit 36 separates the power conversion unit 9 with a fault from the available object, thereby to disconnect the power conversion unit 9 with a fault from the use of the charging equipment 3. Herein, the separation part of unit 36 corresponds to a separation means.

The charging equipment 3 of the present embodiment has a manually setting function by which the charge pattern of the battery is manually set at the charge terminal 18. The reason why the manually setting function is provided with the charging equipment 3 is that a scrupulous service can be offered to each user corresponding to the user's situation by manually setting the charge mode. For example, such a situation includes a case that the user wants to charge the battery with at least a necessary charge amount when the user is in haste, or a case that the user wants to complete the charging until the user finishes business.

In such a case, the terminal controller 23 includes a charge appearance setting processing part 37 which works when the charge pattern is manually set. Further, the charge terminal 18 includes an input part 38 comprising a ten key pad or a selection key pad, and a display 9 which displays various images or letters or the like. The input part 38 and the display 9 are used when a charge pattern is manually set at the charge terminal 18. Note that the charge pattern includes detailed charge contents in which a charge time or a charge speed is used as a parameter. Herein, the charge appearance setting processing part 37, the input part 38, and the display 9 construct a charge pattern input means.

When a charge pattern is inputted by the input part 38 or the display 9, the charge appearance setting processing part 37 outputs the charge pattern as manually setting input data Sc into the charge converter device 6. When the manually setting input data Sc is inputted through the vehicle communication control part 33, the charge operation control part 34 sets the allocation of the power conversion units 9 based on the manually setting input data Sc.

Next, the operation of the charging equipment 3 of the present embodiment will be explained in reference to FIGS. 4 to 6.

Figure 5:
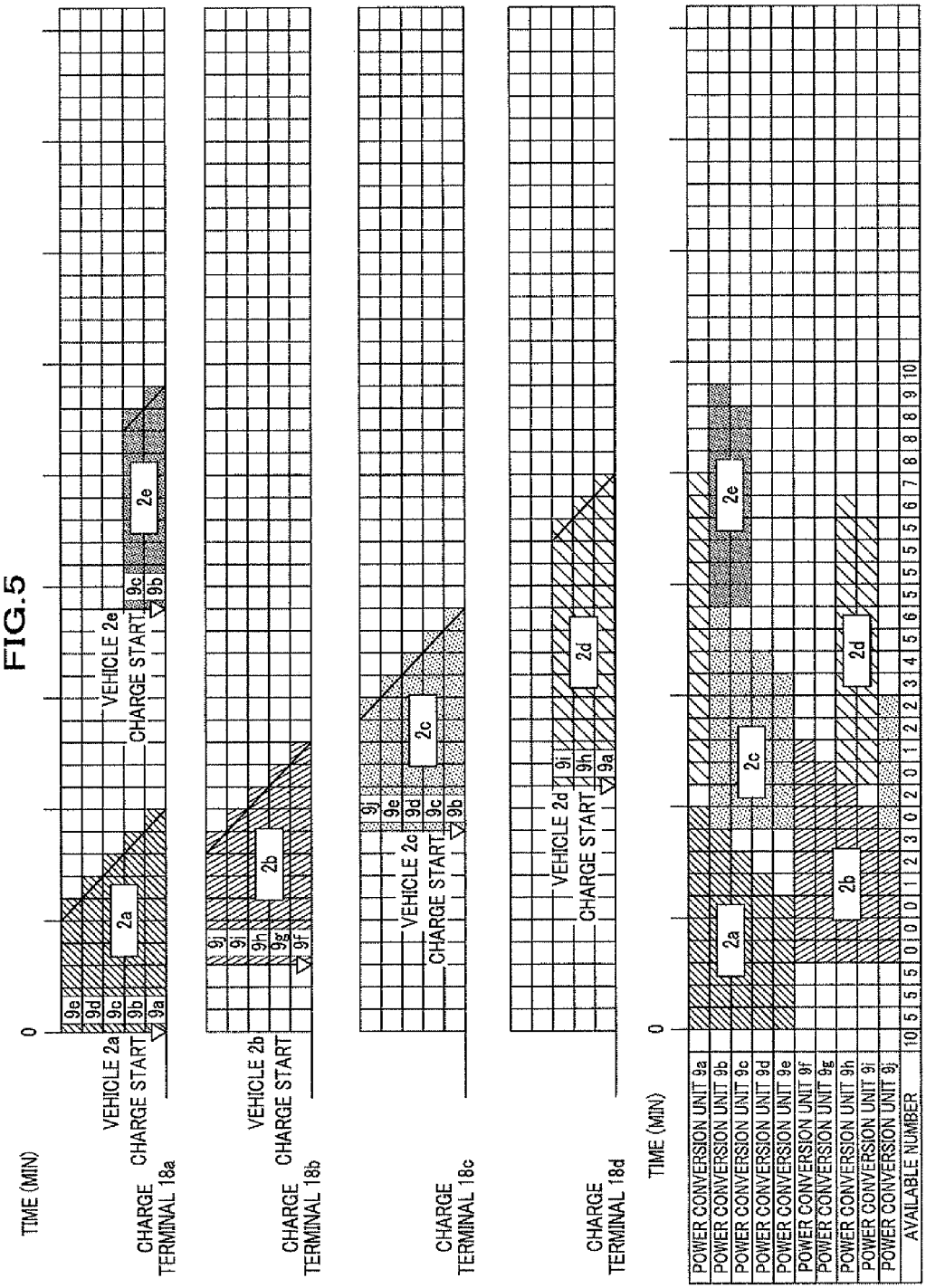
FIG. 5 is a model diagram showing an operation example of the charging equipment.

As shown in FIG. 5, a case is assumed in which a vehicle 2a is charged by a charge terminal 18a. When a charge cable 19 of the charge terminal 18a is connected to the vehicle 2a, a battery control unit 29 of the vehicle 2a outputs necessary electric energy information Sa corresponding to the residual quantity of a battery 4 into the charge terminal 18a. Accordingly, when the charge amount is largely lowered, this information is notified to the charge terminal 18a. Then, when a battery information acquisition part 30 receives the necessary electric energy information Sa, the charge terminal 18a outputs the necessary electric energy information Sa through a battery information transfer part 31 into the charge operation control part 34.

When the necessary electric energy information Sa is inputted from the charge terminal 18a, the charge operation control part 34 changes a switching state of the switching circuit 14 based on the necessary electric energy information Sa, and connects a first power conversion unit 9a to a fifth power conversion unit 9e all of which are in the available state, with the charge terminal 18a. Herein, in the present embodiment, a maximum charge amount per one vehicle such as a vehicle 2 corresponds to the charge amount supplied from the five power conversion units 9. Accordingly, totally added amounts of the five electric powers of the first power conversion unit 9a to the fifth power conversion unit 9e (for example, 25 A×5=125 A) are supplied to the charge terminal 18a, thereby to charge the battery 4 of the vehicle 2a.

Next, a case is assumed in which a vehicle 2b is connected to the charge terminal 18b while the vehicle 2a is being charged. At that time, a battery control unit 29 of the vehicle 2b also outputs necessary electric energy information Sa into the charge terminal 18b, and the charge terminal 18b transfers the necessary electric energy information Sa to the charge operation control part 34. When the charge operation control part 34 receives the necessary electric energy information Sa from the vehicle 2b, the charge operation control part 34 connects the available power conversion units 9 at that time, that is, a sixth power conversion unit 9f to tenth power conversion unit 9j, with the charge terminal 18b. Accordingly, totally added amounts of the five electric powers of the sixth power conversion unit 9f to the tenth power conversion unit 9j are supplied to the charge terminal 18b, thereby to charge the battery 4 of the vehicle 2b. This allows the vehicle 2a and the vehicle 2b to be simultaneously charged.

As shown in FIG. 4, the charge operation is started by the constant current charging. Then, when the charge amount reaches the predetermined amount, the charge current I is decreased at that time and the charge operation is changed to be conducted by the constant voltage charging. Hereby, in the charging at the charge terminal 18a, when the charge amount of the battery 4 reaches the predetermined amount, the unnecessary power conversion units 9 at that time are disconnected one after another from the use. That is, as the charge operation proceeds, the power conversion units 9 are disconnected in the order of $9e \rightarrow 9d \rightarrow 9c \rightarrow 9b \rightarrow 9a$ from the use. Herein, the same charge operation is conducted at the charge terminal 18b.

Here, a case is assumed that when the power conversion unit 9j of the charge terminal 18b is disconnected from the use, the charge operation for a vehicle 2c is started at a charge terminal 18c. At that time, the charge operation control part 34 connects the five power conversion units 9 such as the second power conversion unit 9b to the fifth power conversion unit 9e and the tenth power conversion unit 9j, with the charge terminal 18c, so as to charge the vehicle 2c by using the five added powers.

Further, when a vehicle 2*d* is charged at a charge terminal 18*d*, even though the necessary electric energy information Sa requesting the charging with the maximal electric energy is received, if the number of the available power conversion units 9 is less than 5, the charge operation is conducted using only the available power conversion units 9. That is, if the number of power supplies is insufficient for the requested charging power, the charge operation control part 34 charges the vehicle 2*d* by using only the available power conversion units 9 when starting the charging. As shown in FIG. 5, the battery 4 of the vehicle 2*d* is charged by the first power conversion unit 9*a*, the eighth power conversion unit 9*h* and the ninth power conversion unit 9*i*. Note that in this case a longer charge time is needed than the case in which five power conversion units 9 are used.

Further, when a vehicle 2*e* having a battery 4 with a not so decreased charge amount is to be charged at the charge terminal 18*a* completing the charge of the vehicle 2*a*, a battery control unit 29 of the vehicle 2*e* outputs the necessary electric energy information Sa notifying that the charge amount of the battery 4 is not so decreased, into the charge terminal 18*a*. When the charge operation control part 34 receives the necessary electric energy information Sa, the charge operation control part 34 connects the available power conversion units 9 at that time, for example, the two power conversion units 9 including the second power conversion unit 9*b* and the third power conversion unit 9*c*, with the charge terminal 18*a*, so as to charge the battery 4 of the vehicle 2*e*.

Figure 6:
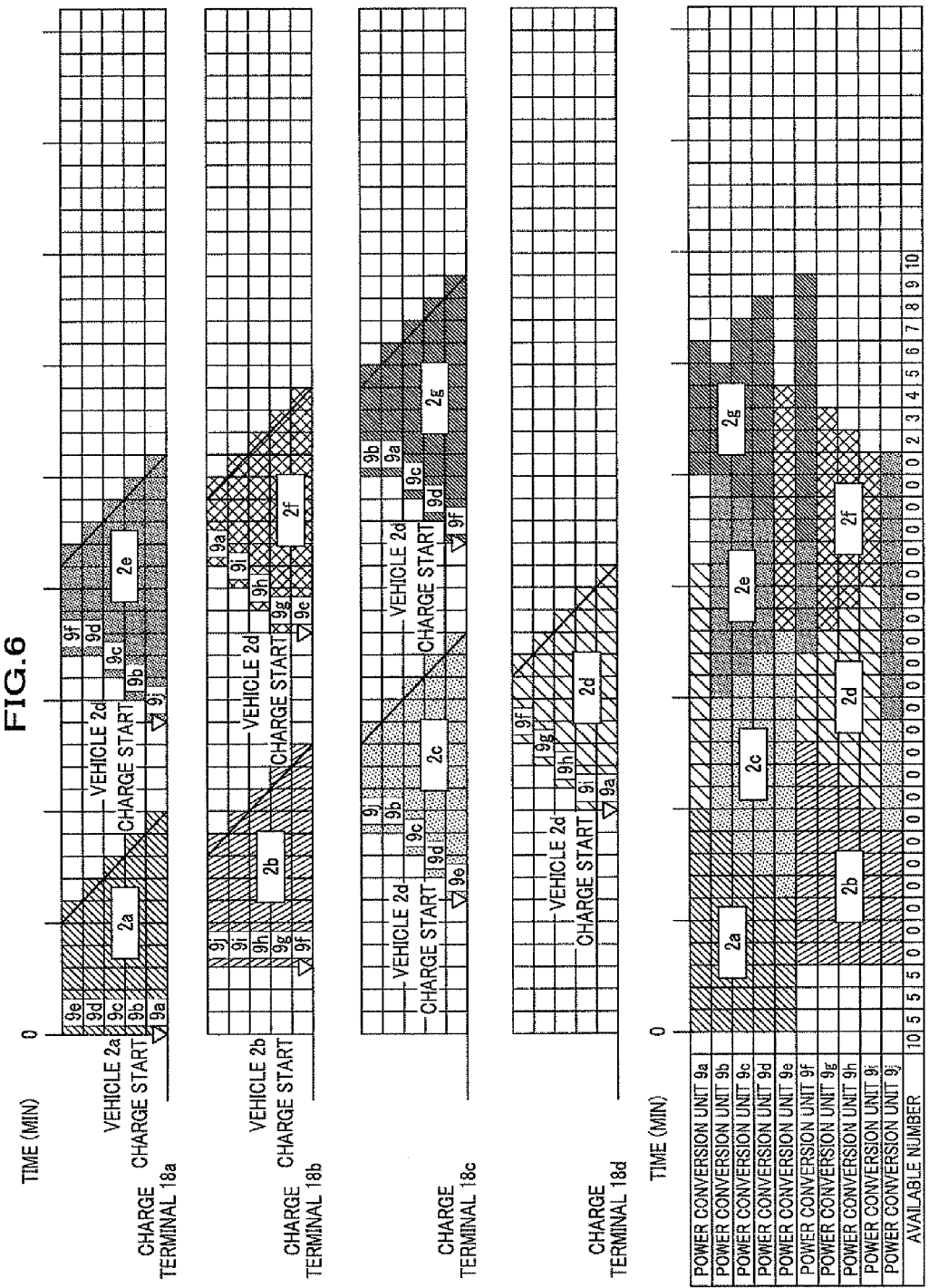
FIG. 6 is another model diagram showing an operation example of the charging equipment.

As shown in FIG. 6, the charge operation control part 34 of the present embodiment can dynamically change the connecting combination of the power conversion units 9 by using the available power conversion units 9 at that time. For example, when two vehicles 2 are simultaneously being charged, if one power conversion unit 9 completes the charging, this available power conversion unit 9 can be allocated to the other charging. This allows the available power conversion unit 9 to be used efficiently, resulting in the more improvement of the charge efficiency.

Further, when the battery 4 is charged at the charge terminal 18, a charge pattern is manually set by a manually setting function of the charge pattern at the charge terminal 18, to conduct the charging associated with the inputted charge pattern. The manually setting charge pattern includes a charge schedule comprising a request for the charge time such as 10 min or 20 min, a request for stopping the charge when the charge amount of the battery 4 is in 80% or more in 10 min, a request for completing the full charging in 60 min, and a request for completing the full charging by the requested time or the like.

Herein, the charge appearance setting processing part 37 outputs the charge schedule as manually setting input date Sc into the charge operation control part 34 through the vehicle communication control part 33. When the charge schedule is inputted, the charge operation control part 34 executes the charging associated with the charge schedule. Herein, every time when a new charge schedule is accepted, the allocation of the power conversion units 9 can be dynamically changed, allowing a new charge schedule to be performed associated with a request from a user.

Further, the manually setting of the charge pattern includes a request item forcedly intruding a charge operation into the charge schedule. When the charge appearance setting processing part 37 detects the intruding request operation at the charge terminal 18, the charge appearance setting processing part 37 outputs the charge intruding request as manually setting input data Sc, into the charge operation control part 34. When the charge intruding request is inputted from the charge terminal 18 and if two vehicles 2 are being charged, the charge operation control part 34 temporally allocates one power supply of the vehicle 2 having a sufficient time for the charging to the other vehicle 2 for the charging thereof, so as to complete to charge the other vehicle 2 in time.

As mentioned above, in the present embodiment, a plurality of small power conversion units 9 are provided with the charge converter device 6, and these power conversion units 9 are allocated to the respective user operation units 7 in use, to supply power sources for charging to the respective charge terminals 18. As a result, a single charge converter device 6 can simultaneously charge a plurality of vehicles 2 because the plurality of charge terminals 18 are available for charging. This allows another waiting vehicle 2 to be charged without waiting the completion of charging the vehicles which are being charged.

Further, during the charging operation, the fault detection part 35 successively monitors if there is a fault in the power conversion units 9. Then, when the fault detection part 35 detects a fault in a power conversion unit 9, the fault detection part 35 notifies which number of the power conversion unit 9 is with a fault into the unit separation part 36. When the number of the power conversion unit 9 is inputted, the unit separation part 36 disconnects the power conversion unit 9 having the number from the use, and excludes the power conversion unit 9 with a fault from the allocation object in the allocation of power supplies hereinafter. Accordingly, the power conversion unit 9 with a fault is not used as a power supply, allowing a normal charge to be conducted.

According to the construction of the present embodiment, the following effects can be achieved as described below.

(1) The charge converter device 6 includes the plurality of power conversion units 9 and the power conversion units 9 are allocated to the respective charge terminals 18 connected with the vehicle 2 as a power supply by the switching circuit 14, to charge the battery 4 of each vehicle 2. As a result, the single charge converter device 6 can operate the plurality of charge terminals 18, allowing the plurality of vehicles 2 to be simultaneously charged. This allows the user not to wait the completion of charging the vehicle 2 being charged in advance, resulting in no inconvenience for the user.

(2) When one vehicle 2 is to be charged while the other vehicle 2 is being charged, the charge operation is conducted by using the available power conversion unit 9 at that time as a power supply. This allows the vehicle 2 to be charged without influencing the charge of the other vehicle 2 being charged at that time.

(3) Before starting the charging, the necessary electric energy information Sa is outputted from the vehicle 2 to the charge converter device 6. Then, the battery 4 is charged by using the number of the power conversion units 9 based on the necessary electric energy information Sa. As a result, a vehicle 2 of which charge amount is largely decreased is charged by the large electric power, while a vehicle 2 of which charge amount is not so decreased is charged by the small electric power. This allows the battery 4 to be preferably charged corresponding to the charge amount thereof at that time.

(4) While the battery 4 is being charged, the charge amount information Sb is outputted from the vehicle 2 to the charge converter device 6. Then, the battery 4 is charged, by changing the allocation of the power conversion units 9 to satisfy the number of the power conversion units 9 needed based on the charge amount information Sb. Accordingly, as shown in FIG. 4, this allows the charge operation to be conducted so that the battery 4 is initially charged by the constant current charging, then charged by the constant voltage charging after the charge amount of the battery 4 becomes sufficiently large.

(5) As shown in FIG. 6, the connecting combination of the power conversion units 9 can be dynamically changed corresponding to the charge amount of the battery 4. As a result, when two vehicles 2 are simultaneously charged, if a power conversion unit 9 is not needed for charging one vehicle 2, this power conversion unit 9 can be allocated to the other vehicle 2 for charging. This allows the power conversion unit 9 to be efficiently used, resulting in the improvement of the charging efficiency.

(6) By providing the manually setting function of the charge pattern with the charging equipment 3, the battery 4 can be charged by the charge pattern corresponding to a user's request. This allows a flexible service to a user to be provided corresponding to the user's request.

(7) When a charge pattern is manually set at the charge terminal 18, the connecting combination of the power conversion units 9 can be dynamically changed corresponding to the charge pattern. This allows the optimal charge operation to be conducted corresponding to a user's request. For example, if a user requests a quick charge, the larger number of the power conversion units 9 are to be allocated for the charging, while if a user does not request a quick charge, the smaller number of the power conversion units 9 are to be allocated for the charging.

(8) The fault detection part 35 monitors if there is a fault in the power conversion units 9. When a fault is detected in a power conversion unit 9, the power conversion unit 9 with a fault is disconnected and other normal power conversion units 9 without a fault are only allocated to the charge terminal 18 as power supplies. As a result, the power conversion unit 9 with a fault is not used as a power supply, allowing the normal charge operation to be secured.

(9) The charging equipment 3 of the present embodiment can simultaneously charge a plurality of vehicles 2 and the connecting combination of the power conversion units 9 can be dynamically changed. This allows the charge time to be greatly reduced.

(10) When the maintenance of the power conversion unit 9 is conducted, it is possible to stop only the operation of the power conversion unit 9 as the maintenance object and keep other power conversion units 9 in use. This allows the target power conversion unit 9 to have the maintenance with keeping the operation of the charging equipment 3.

(11) If the number of the users of the charging equipment 3 increases, it is possible to increase the number of the power conversion units 9 by additionally arranging the power conversion units 9. Since the number of the power conversion units 9 additionally arranged can be changed corresponding to the number of the users, resulting in the decrease of the initial costs needed for the charging equipment 3.

Here, the present embodiment is not limited to the above mentioned construction, and can be modified as mentioned below.

As shown in FIG. 1, the charge converter device 6 may comprise a host communication control part 51 and the host communication control part 51 may transmit various information on the charge operation into a server through the network. In such a case, it is possible to collect the using status information from the charge converter device 6 arranged in various locations, resulting in the more improvement of the services.

Figure 7:
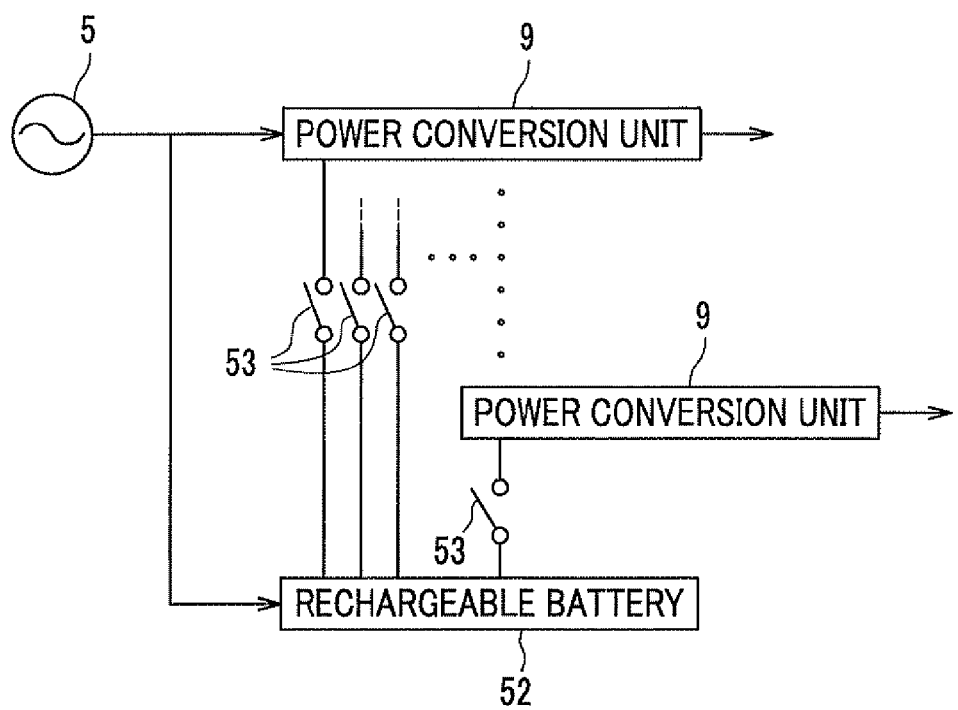
FIG. 7 is a block diagram showing a part of another example of the charging equipment.

As shown in FIG. 7, the charge converter device 6 may be equipped with a rechargeable battery 52 for using the rechargeable battery 52 as a power supply of a power conversion unit 9. In such a case, the rechargeable battery 52 may be charged at night with a lower electricity rate, and the rechargeable battery 52 may be used as a power supply in the daytime by turning on a switch 53 arranged on the pathway to the rechargeable battery 52. Further, the rechargeable battery 52 may be used as an emergency power supply at the time of power cut.

A control method of controlling the charge current I conducted by the constant current charging following by the constant voltage charging is not limited to the method of gradually decreasing the charge current I by decreasing the number of the power conversion units 9 in use. For example, it is possible to use a method of decreasing the charge current I by changing the current outputted from the power conversion unit 9.

When a charge operation is started with the insufficient number of the power conversion units 9, if other power conversion unit 9 becomes available, the available power conversion unit 9 may be allocated to the charging operation with the insufficient number of the power conversion units 9 as a power supply.

Further, the charge terminal 18 may be provided with an electricity leakage detecting function and an opening and closing function. Accordingly, when a leakage of electricity is detected at the charge terminal 18, the charge terminal 18 may be disconnected from the power supply by using the opening and closing function.

When a vehicle 2 is newly charged, one of the power conversion units 9 almost completing the charging operation, may be forcedly used as a power supply for newly charging the vehicle 2.

Further, it is also possible to fixedly connect the power conversion units 9 among the plurality of power conversion units 9, with the plurality of charge terminals 18 in advance. In such a case, only the remaining power conversion unit 9 may be flexibly allocated to the charge terminal 18.

Here, the device mounted with battery is not limited to a vehicle 2 such as an electric automobile and a hybrid vehicle. For example, the device mounted with battery may be an automatic transporter, a fork lift, a robot, a visitor cart, a motorcycle or a bus.

Next, the technical ideas of the above mentioned embodiment and other examples will be described hereinafter, in addition to their effects.

(1) The charge control unit dynamically changes the allocation of the power conversion units based on the charge pattern manually set by a user. In this construction, when the charge pattern is manually set by a user, the allocation of the power conversion units is dynamically changed corresponding to the charge pattern. Accordingly, for example, if a user requests a quick charge, the larger number of the power conversion units 9 are to be allocated for the charging, while if a user does not request a quick charge, the smaller number of the power conversion units 9 are to be allocated for the charging. As a result, the optimal charge operation can be conducted corresponding to a user's request.

(2) According to any one of the technical ideas described in (1), the charge pattern includes a charge schedule requested by the user. The charge control unit allocates the power conversion units based on the charge schedule. This construction allows the charge operation to be conducted associated with the charge schedule set by the user.

(3) According to any one of the technical ideas described in (1) and (2), the charge pattern includes an intruding request for charging. The charge control unit preferentially charges the device mounted with battery sending the intruding request for charging. This construction allows the user's request to be satisfied who is in haste for the charging.

Second Embodiment

Next, a second embodiment of the charging equipment of the present invention will be described. Herein, for the common parts with the first embodiment, the constructions and descriptions shown in the first embodiment can be applied thereto. Therefore, the different parts from the first embodiment will be mainly explained.

In the first embodiment, in the charging equipment 3, the manually setting function is provided for manually setting the charge pattern of the battery 4 at the charge terminal 18. When the charge pattern is set, the charge operation is conducted following the set charge pattern. In the second embodiment, by using the manually setting function, a function of the timer charge is more specifically realized, by which the charge operation is conducted to satisfy the charge schedule defining the charge end time of the battery 4 equipped with a vehicle 102 as a device mounted with battery. Further, a function of the quick charge is more specifically realized, by which the charge operation is conducted to satisfy the quick charge request requesting to immediately charge the battery 4 with the predetermined charge output capacity.

Figure 8:
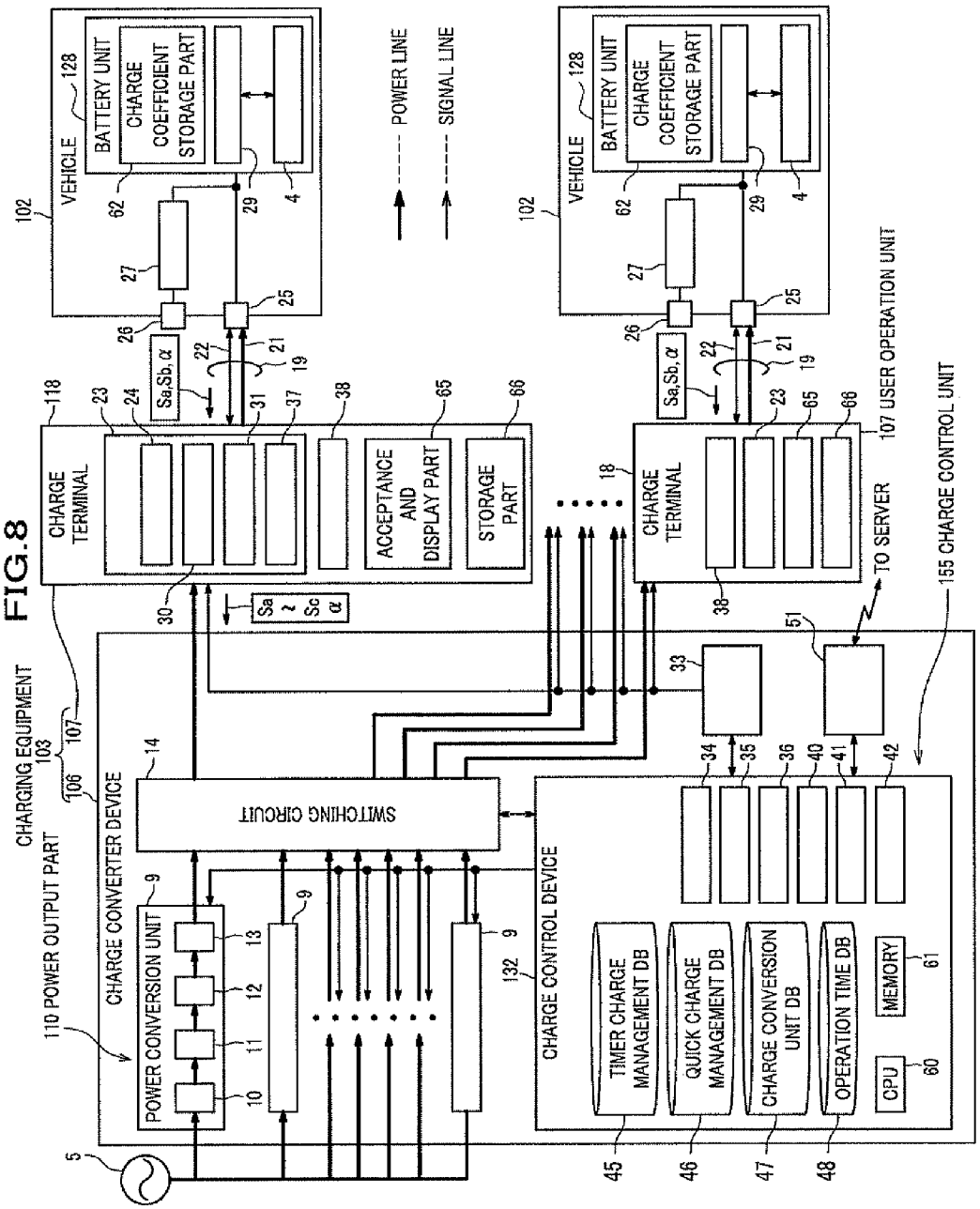
FIG. 8 is a block diagram showing the charging equipment in a second embodiment of the present invention.

FIG. 8 is a block diagram showing the charging equipment of the second embodiment of the present invention.

As shown in FIG. 8, charging equipment 103 of the second embodiment further comprises the construction for realizing both functions of the timer charge and the quick charge in comparison to the charging equipment 3 (see FIG. 1) of the first embodiment.

That is, a charge control device 132 in a charge converter device 106 of the charging equipment 103 comprises a charge application processing part 40, a timer charge processing part 41, a quick charge processing part 42, a timer charge management database (hereinafter, referred to "DB") 45, a quick charge management DB 46, a power conversion unit DB 47, an operation time DB 48, a CPU 60, and a memory 61, in addition to the charge operation control part 34, the fault detection part 35, and the unit separation part 36. Herein, the charge control device 132 and the switching circuit 14 construct a charge control unit 155.

In the second embodiment, the processing parts 40 to 42, the DBs 45 to 48, the CPU 60 and the memory 61 are additionally included. This allows the charging equipment 103 to correspond to both needs as mentioned below within a limited equipment capacity (or charge output capacity). One of the needs is related to the time, for example, by when the charge operation should be completed. The other need is, for example, a demand for immediately conducting the charge operation with the predetermined charge output capacity.

The charge application processing part 40 performs a process of the charge application. The timer charge processing part 41 performs an allocation process of the power conversion units 9 for the timer charge. The quick charge processing part 42 performs an allocation process of the power conversion units 9 for the quick charge. Herein, the functions of the processing parts 40 to 42 are performed by the CPU 60 of executing a predetermined program stored in the memory 61.

The timer charge management DB 45 is a database for managing the timer charge. The quick charge management DB 46 is a database for managing the quick charge. The power conversion unit DB 47 is a database for managing the allocation of the power conversion units 9 used for charging. The operation time DB 48 is a database for managing the accumulation operation time of the power conversion unit 9.

The charge converter device 106 in the second embodiment comprises a power output part 110 including a plurality of power conversion units 9 which convert the AC power of the system power supply 5 into the DC current/voltage suitable for charging.

Further, the charge terminal 118 in the second embodiment comprises an acceptance and display part (or display) 65 and a storage part 66 instead of the display 39 in the first embodiment (see FIG. 1). The acceptance and display part 65 is, for example, a touch panel for inputting or displaying various information.

FIG. 9 is a diagram showing a data structure of the timer charge management DB.

As shown in FIG. 9, the timer charge management DB 45 stores a charge coefficient α, a residual quantity (or battery residual quantity) when the charge of the battery 4 in the vehicle 102 is applied, a charge rate (%) when the charging is ended specified at the charge application time, a connection starting time, a charge end time specified at the charge application time, a charge rate (%) when the charging is ended scheduled after the power conversion unit allocation, a charge start time and a charge end time scheduled after the power conversion unit allocation, a charge output capacity (kW), and an RT flag, at each charge terminal 18. Herein, each of the plurality of charge terminals 18 has the consecutive number, for example, referred to the charge terminals No. 1 to No. 4.

Here, the charge coefficient α is a coefficient indicating the increase of the charge rate when the battery 4 is charged by the unit time charging with the unit charge output capacity. The coefficient is calculated the following equation.

Charge Coefficient α=Increased Charge Rate (%)/(Charge Output Capacity (kW)×Charge Time (min))

It is assumed that the charge time for the charge output capacity varies depending on the performance of the battery 4. Hereby, the charge coefficient α is used to calculate how many minutes it takes to reach the charge rate demanded by the user. In the second embodiment, the vehicle 102 comprises a storage part for storing the charge coefficient α. That is, a battery unit 128 of the vehicle 102 in the second embodiment comprises a charge coefficient storage part 62 storing the charge coefficient α of the battery 4 equipped with the vehicle 102 (see FIG. 8).

Note that the charge coefficient α may be calculated by acquiring information (or value) including a model number of the battery 4, by which the charge coefficient α can be calculated, thereby to calculate the charge coefficient α based on the information. Further, another method can be used in which a performance of the battery 4 in the vehicle 102 is regularly measured. Then, the information by which the charge coefficient α can be calculated may be updated based on the measured result. This allows the charge schedule to be achieved more accurately.

FIG. 10 is a diagram showing a data structure of the quick charge management DB.

As shown in FIG. 10, the quick charge management DB 46 stores a charge terminal number, a charge coefficient α, a battery residual quantity (%) at the charge application time, a charge rate (%) when the charging is completed specified at the charge application time, a specified charge output capacity (kW) at the charge application time, a charge start time and a charge end time specified at the charge application time, a charge rate (%) when the charging is completed scheduled after the power conversion unit allocation, a charge output capacity (kW) scheduled after the power conversion unit allocation, and a charge start time and a charge end time scheduled after the power conversion unit allocation. Herein, the charge coefficient α is used for the same purpose as explained in FIG. 9 and is calculated in the same equation described hereinbefore.

Figure 11:
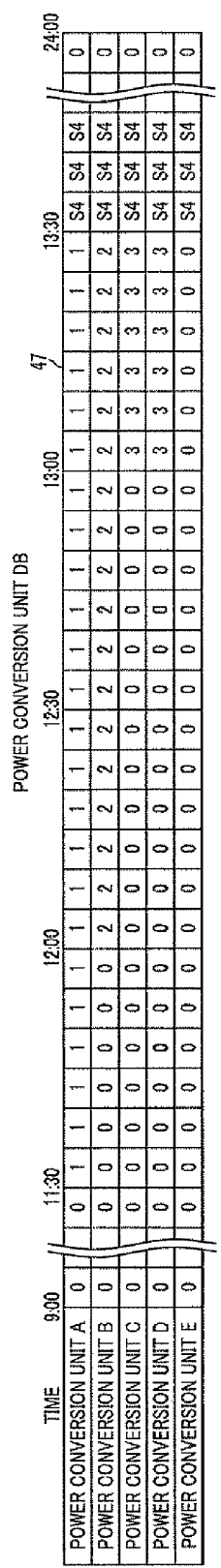
FIG. 11 is a diagram showing a data structure of the power conversion unit DB.

FIG. 11 is a diagram showing a data structure of the power conversion unit DB.

As shown in FIG. 11, in the case of the timer charge, the power conversion unit DB 47 stores the number of the charge terminal to which the power is supplied; the number being set (or stored) with a predetermined time unit (in this case, 5 min unit) for each of the plurality of power conversion units 9. Further, in the case of the quick charge, the power conversion unit DB 47 stores the number of the charge terminal to which the power is supplied; the number being set (or stored) by adding "S" at the beginning of the number. Herein, a sequential alphabetical letter is added to each of the plurality of power conversion units 9, for example, referred to the power conversion units A to E.

Here, the following method may be used. That is, the information on the time zone of the peak electric power (or time zone with peak electricity consumption) is acquired from a server computer (not shown) arranged outside the charging equipment 3 through the host communication control part 51. Then, the predetermined number of the power conversion units 9 are selected in the order of longer operation time among the plurality of power conversion units 9 indicated by the operation time DB 48 (for example, the power conversion unit 9 with the longest operation time). Then, the operation of the selected power conversion units 9 is restricted during the time zone of the peak electric power. By using the above mentioned method, it is possible to add a function for restricting the maximum power quantity only during the time zone of the peak electric power.

FIG. 12 is a diagram showing a data structure of the operation time DB.

As shown in FIG. 12, the operation time DB 48 stores an accumulation operation time for each of the plurality power conversion units 9 (A to E). The accumulation operation time described in FIG. 12 is shown as the time per one year. However, it is possible to optionally decide what time unit may be used to accumulate the operation time. By using the operation time DB 48, it is possible to level the use of the plurality of power conversion units 9.

Figure 13:
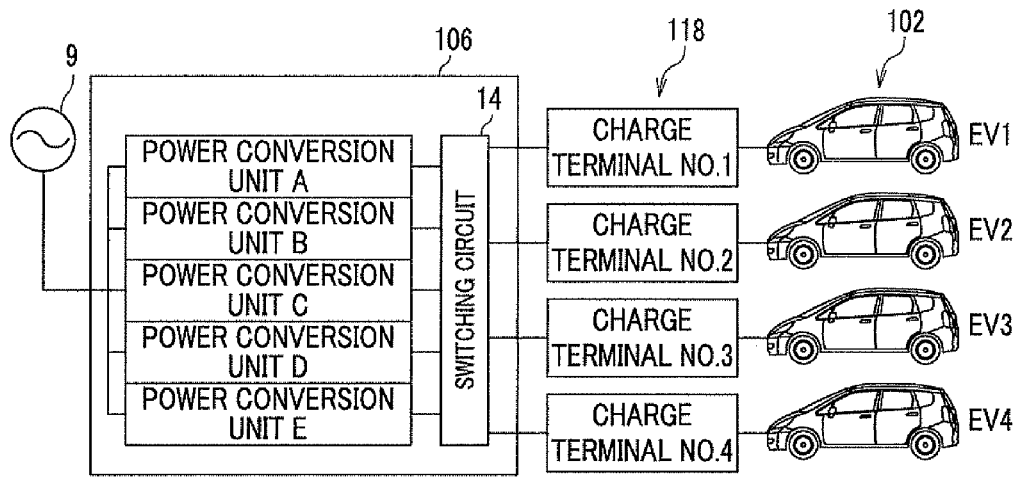
FIGS. 13A to 13D are diagrams each explaining an example of the charging operation performed in the charging equipment of the second embodiment.

FIGS. 13A to 13D are diagrams each showing an example of the charging operation conducted by the charging equipment of the second embodiment. FIG. 13A shows vehicles to be charged and the charge operation contents thereof. FIG. 13B is a diagram showing the state that the vehicles to be charged are connected to the charging equipment. FIG. 13C shows the allocation result of the power conversion units when three vehicles are sequentially connected to the charging equipment. FIG. 13D shows the allocation result of the power conversion units when another vehicle is additionally connected to the charging equipment following the first three vehicles.

Here, the sequential number of reference is added to each of the vehicles 102 as a plurality of devices mounted with battery, that is, referred to the vehicles EV1 to EV4. Further, the charge output capacity (or supplied power) of the respective power conversion units A to E is 10 kW, which is the same capacity as in the first embodiment. Herein, the vehicles EV1 to EV4 are vehicles which can be charged so that each charge rate is increased from 0% to 80% by charging each vehicle with the power of 20 kW for 80 min. In such a case, the following equation is obtained.

$$\text{Charge Coefficient } \alpha = 80/(20 \times 80) = 0.05$$

FIGS. 13A to 13D show that the plurality of vehicles EV1 to EV4 are sequentially connected to the charge terminal No. 1 to No. 4, and the respective charge patterns (timer charge or quick charge) are set at the charge terminal No. 1 to No. 4. Further, these FIGS show how the use (or allocation) of the power conversion units is changed before/after the vehicle EV4 is added. When a user of the vehicle EV4 requests a quick charge at 13:30, the charge operation for the EV2 and EV3 is temporally stopped, then restarted when the charge operation of EV4 is completed. As mentioned above, the timer charge function provided with the charge converter device 106 allows the function for improving the convenience to be realized, including the function of intruding quick charging, or completing the charging within the specified charge end time.

Next, the operation of the charging equipment 103 in the second embodiment will be explained in reference to the flowcharts shown in FIGS. 14 to 19. Here, the total explanation will be shown focusing on the processing executed by the charge converter 106 in the charging equipment 103. Note an example in which a vehicle 102 is an electric automobile will be explained as a device mounted with battery.

Figure 14:
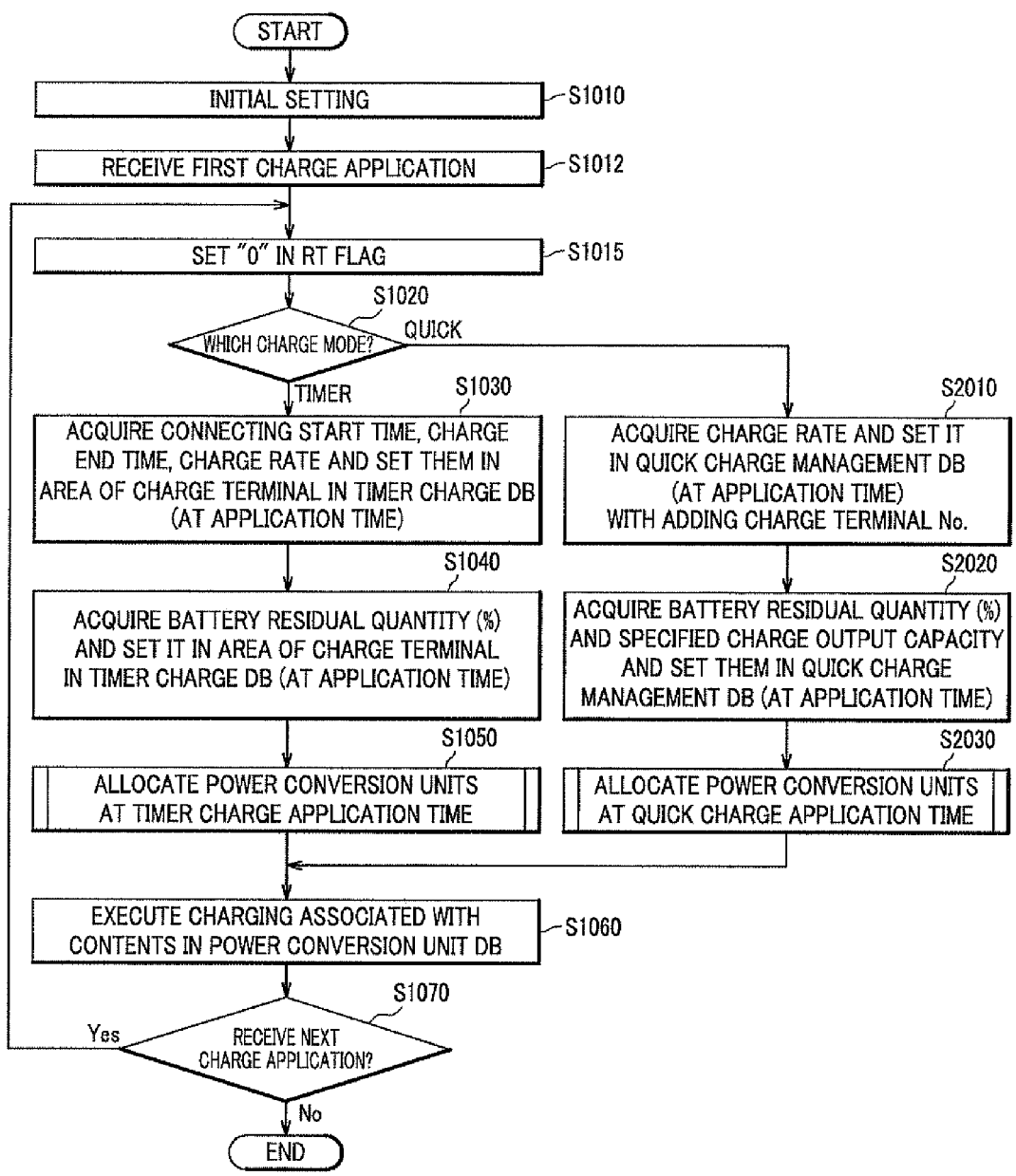
FIG. 14 is a flowchart showing a total procedure of the charging process which realizes both charging methods of the timer charge and the quick charge in the second embodiment.

FIG. 14 is a flowchart showing a total procedure for conducting the charge processing which realizes both charge modes of the timer charge and the quick charge in the second embodiment.

The charge application processing unit 40 starts the operation before the operation start time (or business start time) of the charging equipment 103. Herein, the charge application processing unit 40 may start at the predetermined time, or at the time when the operation manager turns on the main switch (not shown).

First, the charge application processing unit 40 performs the initial setting (Step 1010). That is, the charge application processing unit 40 sets the timer setting feasible time (or charge end time capable of being specified), and initializes the power conversion unit DB 47 (that is, setting the initial value of "0"). Herein, the timer setting feasible time may be, for example, a business end time.

Then, the charge application processing unit 40 receives the information on the initial charge application from the charge terminal 118 (Step 1012).

The charge application is conducted at the charge terminal 118 by the following procedure. The charge appearance setting processing part 37 of the charge terminal 118 displays a charge reservation/message screen (or acceptance screen) 201 on the acceptance and display part 65, as shown in FIG. 20.

Figure 20:
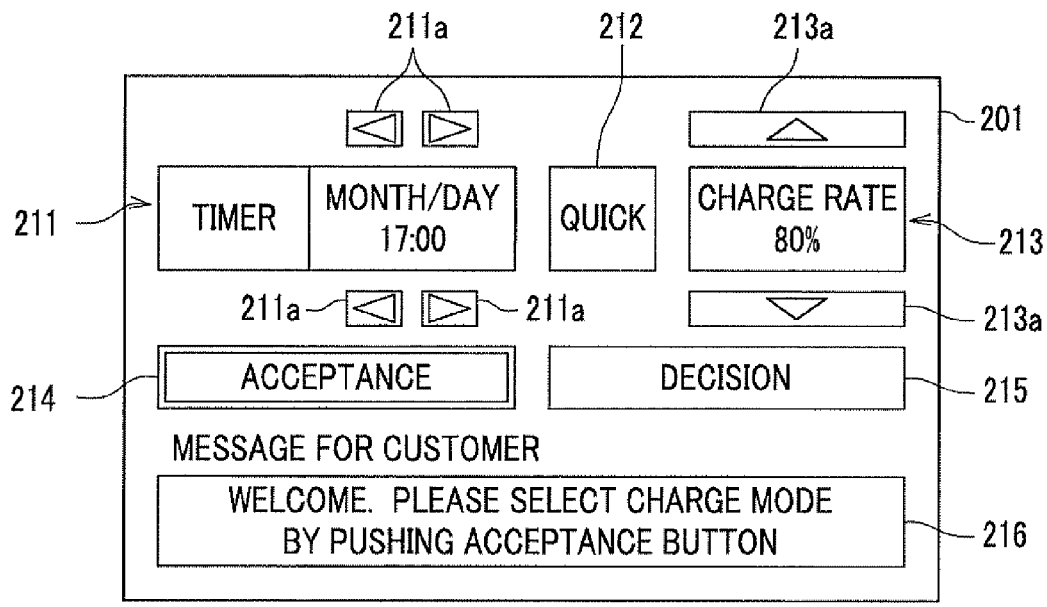
FIG. 20 is a diagram showing a charge reservation/message screen when waiting the charge reservation.

FIG. 20 is a diagram showing a charge reservation/message screen waiting a charge reservation. The charge reservation/message screen 201 comprises a timer charge acceptance part 211 which accepts the charge schedule specifying the charge end time of the battery 4, a quick charge acceptance part 212 which accepts the quick charge request requesting to immediately execute the charge operation with a predetermined charge output capacity of the battery 4, a charge target acceptance part 213 which accepts a value of the charge rate of the battery 4, an acceptance button 214 which accepts a charge application, a decision button 215 which decides the specified charge pattern, and a message displaying area 216 which displays a message to the user. Herein, the timer charge acceptance part 211 comprises a plurality of specifying buttons 211a for specifying the charge end time. The charge target acceptance part 213 comprises a plurality of specifying buttons 213a for specifying the value of the charge rate. Then, when the acceptance button 214 is pushed, the charge appearance setting processing part 37 transmits the information that the charge application was accepted into the charge converter device 106.

As shown in the step 1015 of FIG. 14, when the charge application processing unit 40 receives the information that the initial charge application was accepted, the charge application processing unit 40 sets the initial value of "0" in the RT flag of the timer charge management DB 45.

In the step 1020, the charge application processing unit 40 determines whether the charge mode selected by the user for the vehicle 102 to be connected with one of the plurality of charge terminals 118 (for example, charge terminal No. 1 to No. 4), is a timer charge or a quick charge.

Herein, the selection of the charge mode is conducted at the charge terminal 118 as follows. That is, the charge appearance setting processing part 37 displays a charge reservation/message screen 202 on the acceptance and display part 65 as shown in FIG. 21.

Figure 21:
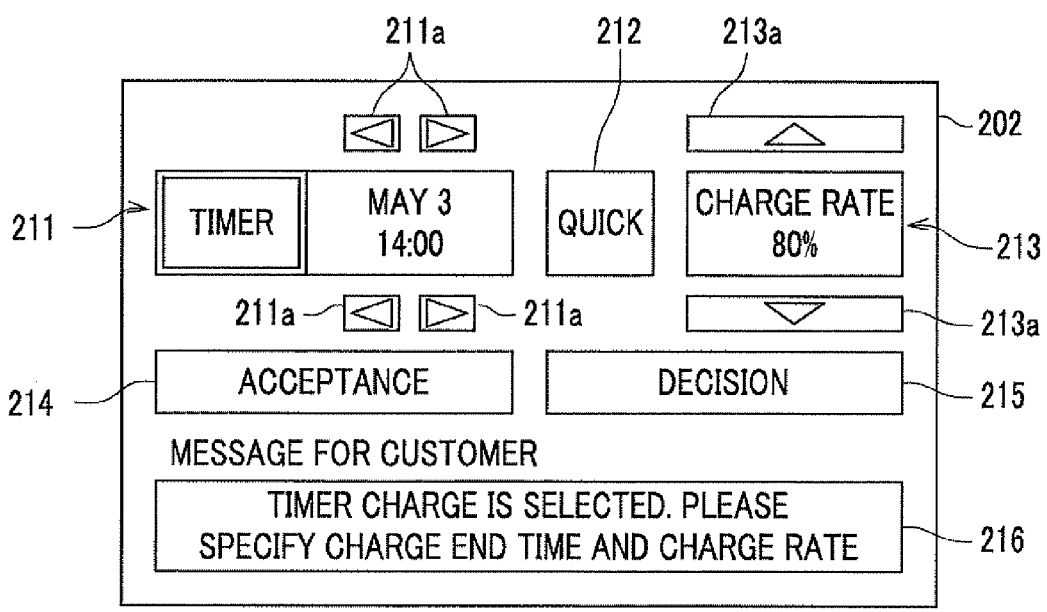
FIG. 21 is a diagram showing a charge reservation/message screen when the timer charge is selected.
Figure 22:
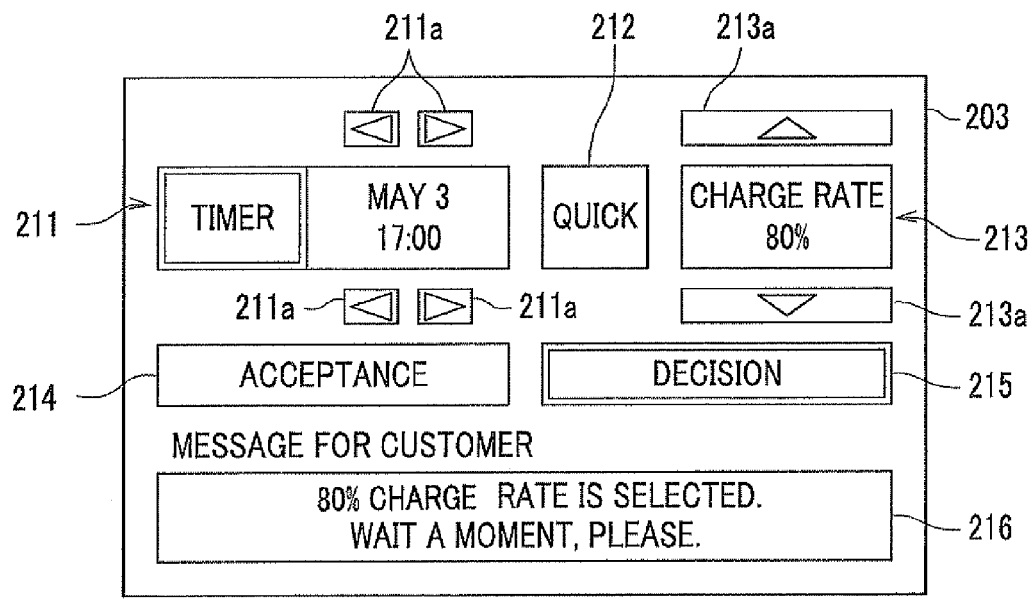
FIG. 22 is a diagram showing a charge reservation/message screen when the charge schedule and the charge rate are selected in the timer charge.

FIG. 21 shows a charge reservation/message screen when the timer charge was selected. When the timer charge acceptance part 211 is pushed, the charge appearance setting processing part 37 displays a message in the message display area 216 for requesting the user to specify the charge end time and the charge rate. Herein, a default charge end time and a default charge rate are displayed on the initial screen. When the charge end time is specified at the timer charge acceptance part 211, the charge rate is specified at the charge target acceptance part 213, and the decision button 215 is pushed, the charge appearance setting processing part 37 stores the accepted information in the storage part 66. Then, the charge appearance setting processing part 37 displays a charge reservation/massage screen 203 shown in FIG. 22, and transmits the accepted information stored in the storage part 66 into the charge converter device 106. Herein, the accepted information is transmitted as manually setting input data Sc (see FIG. 8) on the charge pattern information including the charge mode. FIG. 22 shows a charge reservation/message screen when the charge schedule and the charge rate were specified in the timer charge. Although there is a standard that an upper value of the charge rate capable of being set exists, for example, 80%, it is possible to optionally change the upper value of the charge rate by improving the performance of the battery 4.

Figure 23:
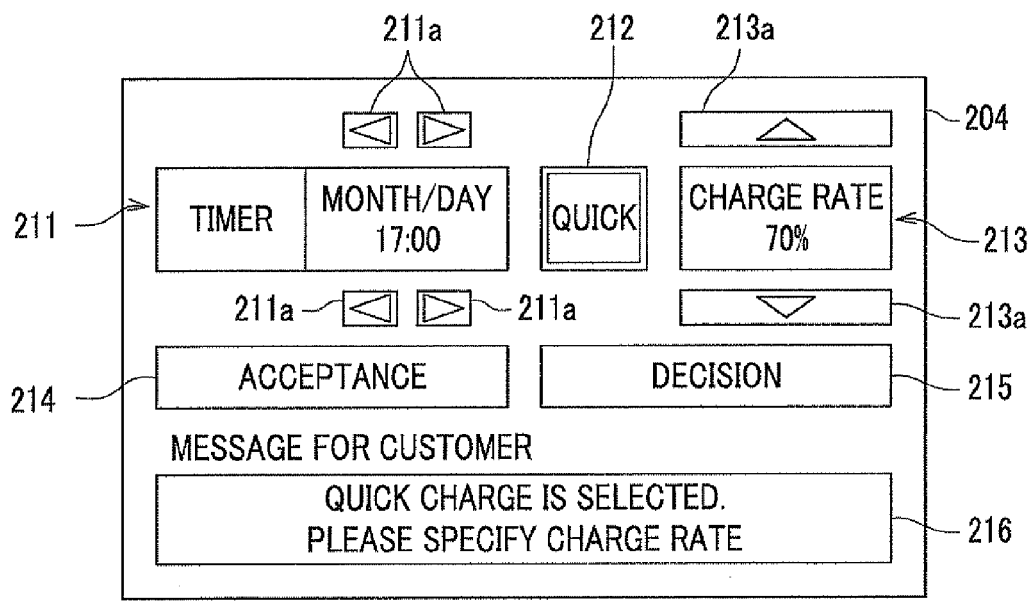
FIG. 23 is a diagram showing a charge reservation/message screen when the quick charge is selected.
Figure 24:
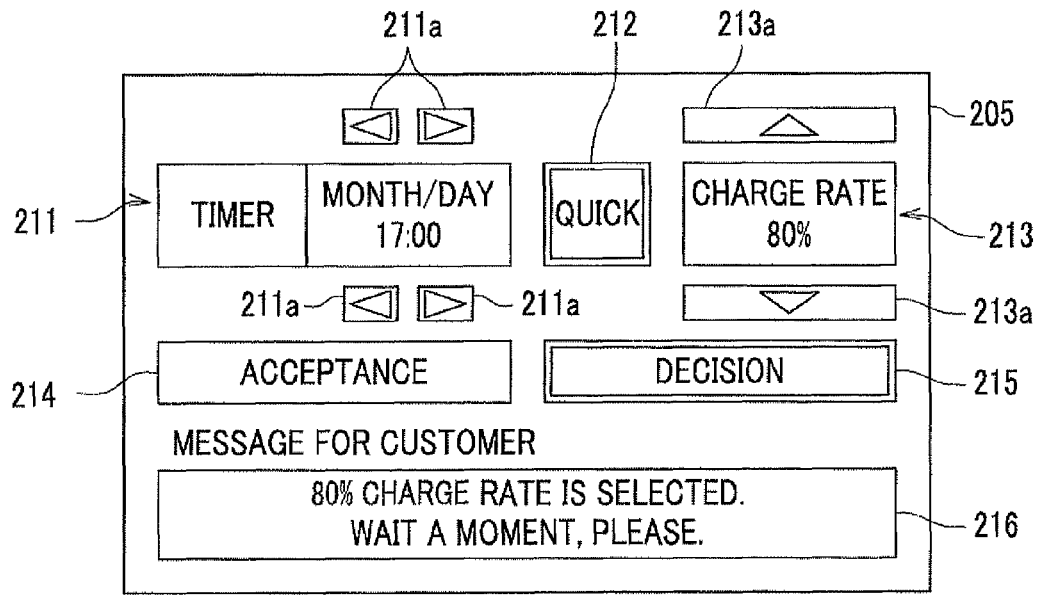
FIG. 24 is a diagram showing a charge reservation/message screen when the charge rate is selected in the quick charge.

FIG. 23 shows a charge reservation/message screen when the quick charge was selected. When the quick charge acceptance part 212 is pushed, the charge appearance setting processing part 37 displays a message in the message display area 216 for requesting the user to specify the charge rate. Herein, a default charge rate is displayed on the initial screen. When the charge rate is specified at the charge target acceptance part 213 and the decision button 215 is pushed, the charge appearance setting processing part 37 stores the accepted information in the storage part 66. Then, the charge appearance setting processing part 37 displays a charge reservation/massage screen 205 shown in FIG. 24, and transmits the accepted information stored in the storage part 66 into the charge converter device 106. Herein, the accepted information is transmitted as manually setting input data Sc (see FIG. 8) on the charge pattern information including the charge mode. FIG. 24 shows a charge reservation/message screen when the charge rate was specified in the quick charge.

In the step 1020 of FIG. 14, when the charge application processing part 40 determines that the selected charge mode is a timer charge based on the received manually setting input data Sc ("timer" in step 1020), the charge application processing part 40 advances the process to the step 1030. In contrast, when the charge application processing part 40 determines that the selected charge mode is a quick charge based on the received manually setting input data Sc ("quick" in step 1020, the charge application processing part 40 advances the process to the step 2010.

Firstly, the case that the timer charge is selected will be explained hereinafter.

The timer charge processing part 41 acquires the data on the connecting start time, the charge end time, and the charge rate from the manually setting input data Sc received from the charge terminal 118, thereby to set the data into the columns of the charge terminal 118 in the area of the timer charge management DB at the application time (see FIG. 9) (Step 1030). Herein, the connecting start time is a time when the user connects the vehicle 102 with the charge terminal 118 and pushes the decision button 215 on the charge reservation/message screen 203 (see FIG. 22) displayed on the acceptance and display part 66 of the charge terminal 118.

Next, the timer charge processing part 41 acquires the battery residual quantity (%) of the battery 4 in the vehicle 102, by communicating with the vehicle 102 through the charge terminal 118, thereby to set the data into the corresponding columns in the area of the timer charge management DB at the application time, related to the charge terminal 118 (Step 1040). Herein, the battery residual quantity (%) can be calculated by the necessary electric energy information Sa (see FIG. 8) before starting the charging. The necessary electric energy information Sa in the second embodiment includes the data of (1) an upper limit value of the charge voltage, (2) a battery total capacity, (3) a specified current value (initial), (4) a battery residual capacity, and (5) an upper value of the charge current. Herein, the above mentioned data are provided by adding the data of (5) an upper value of the charge current to the necessary electric energy information Sa in the first embodiment. More specifically, the battery residual quantity (%) is calculated by the following equation.

$$\text{Battery Residual Quantity (\%)} = \text{Battery Residual Capacity}/\text{Battery Total Capacity} \times 100$$

Next, the timer charge processing part 41 allocates the power conversion units when the timer charge is applied (Step 1050). Here, the charge terminal No. is set to each of the plurality of power conversion units 9 (A to E) in the power conversion unit DB 47 (see FIG. 11). Note the step 1050 will be explained in detail hereinafter (see FIG. 15).

Next, the case that the quick charge is selected will be explained.

The quick charge processing part 42 acquires the charge rate data from the manually setting input data Sc received from the charge terminal 118, thereby to set the charge rate in the area of the quick charge management DB at the application time (see FIG. 10) with adding the charge terminal No. (Step 2010).

Next, the quick charge processing part 42 acquires the battery residual quantity (%) and the specified charge output capacity (kW) on the battery 4 in the vehicle 102, by communicating with the vehicle 102 through the charge terminal 118, thereby to set the above mentioned data in the area of the quick charge management DB 46 at the application time (Step 2020). Herein, the specified charge output capacity (kW) is a charge output capacity (or supplied power) specified corresponding to the available capacity of the battery 4 as the electric power needed for the quick charge. The specified charge output capacity is calculated by the necessary electric energy information Sa (see FIG. 8).

Then, the quick charge processing part 42 allocates the power conversion units at the time of the quick charge application (Step 2030). Here, the charge terminal No. is set to each of the plurality of power conversion units 9 (A to E) in the power conversion unit DB 47 (see FIG. 11). Note the step 2030 will be explained in detail hereinafter (see FIG. 17).

In the step 1060, the charge operation control part 34 in the charge control device 132 determines the upper limit value of the charge output capacity (or supplied power) by communicating with the vehicle 102 before starting the charging, then executes the charging associated with the contents in the power conversion unit DB 47 (Step 1060). Herein, if the charge output capacity is changed during the operation, the charge operation control part 34 temporally stops the charging, and restarts the charging after determining the upper limit value of the charge output capacity by communicating again with the vehicle 102.

In such a case, the charge operation control part 34 may grasp the number of the power conversion units capable of being disconnected and input the data into the power conversion unit DB 47 (see FIG. 11). As shown in FIGS. 13A to 13D, the charge operation control part 34 secures the five power conversion units (A to E) for 30 min to charge the vehicle EV4. However, if the necessary charge amount is supplied by the number of the power conversion units used for four vehicles for the last 10 min, the charge operation control part 34 may separate the power conversion unit A with the longest operation time referring to the operation time DB 48 (see FIG. 12) (that is, may exclude the unit A from the use), thereby to reflect the result in the power conversion unit DB 47.

In the step 1070, the charge application processing unit 40 decides whether a next charge application is received or not. The next charge application may be, for example, a charge application through other charge terminal 118. When the next charge application is received (Step 1070: Yes), the charge application processing unit 40 returns the process to the step 1015. In contrast, when the next charge application is not received (Step 1070: No), the charge application processing unit 40 goes in a standby state waiting the next charge application. Accordingly, the process in FIG. 14 terminates when business is over or when a main switch (not shown) is turned off or the like.

Figure 15:
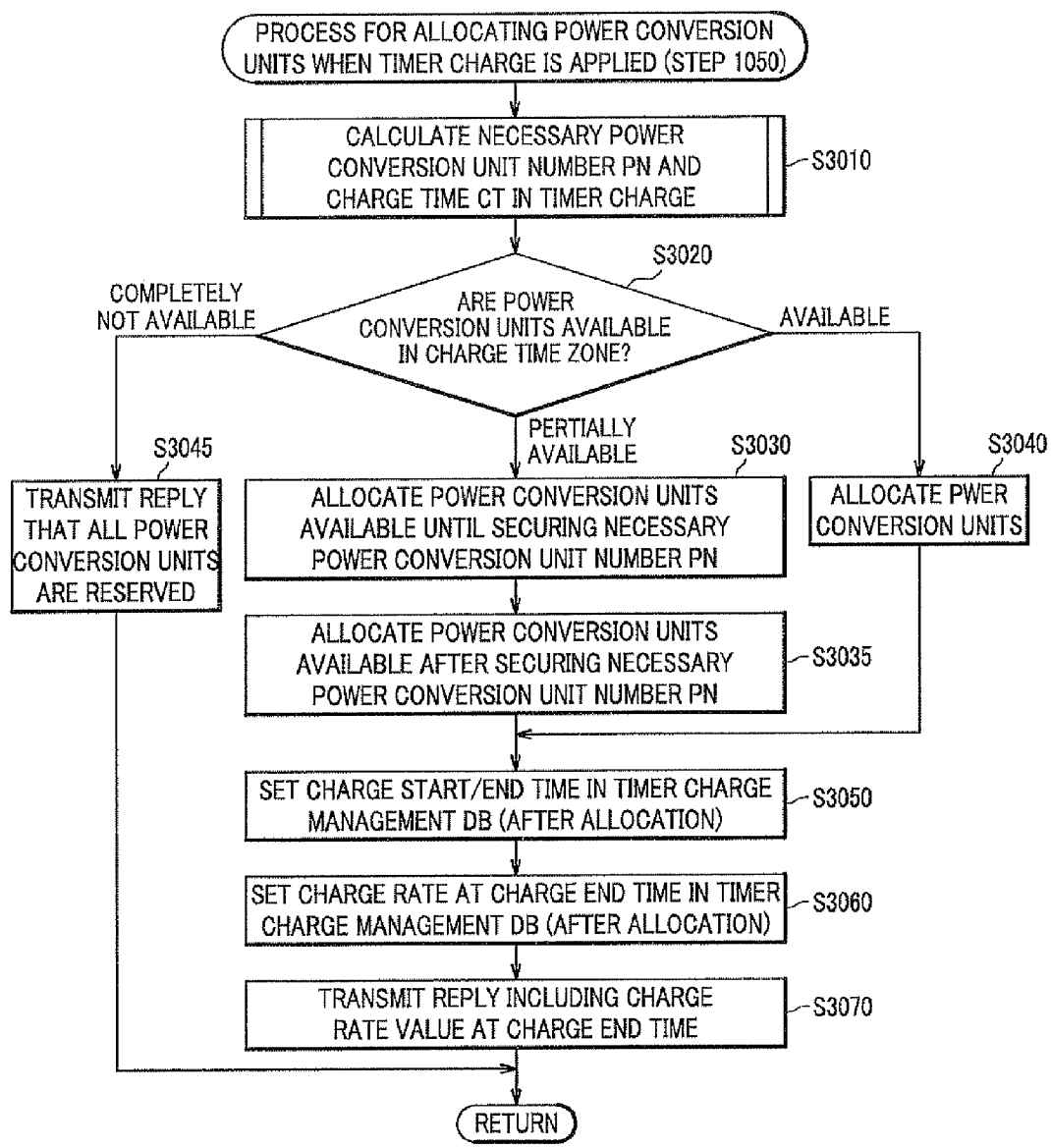
FIG. 15 is a flow chart showing an allocation process of the power conversion units when the timer charge is applied.

Next, referring to FIG. 15, the allocation process of the power conversion units when the timer charge is applied (Step 1050) will be explained in detail.

First, the timer charge processing unit 41 calculates the number of the necessary power conversion units PN and the charge time CT in the timer charge (Step 3010). That is, the timer charge processing unit 41 acquires a charge coefficient α from the vehicle 102 through the charge terminal 118, and sets the value in the timer charge management DB 45. Then, using the charge coefficient α, the timer charge processing unit 41 calculates the number of the necessary power conversion units PN, which is the number of the units 9 capable of completing the charge for achieving the charge rate specified by a user at the specified charge time zone from the connecting start time to the charge end time specified by the user. Then, the timer charge processing unit 41 calculates the charge time CT needed in the charge processing when the charge processing is conducted by using the number PN power conversion units 9. The timer charge processing unit 41 stores the values of the number PN of the necessary power conversion units 9 and the charge time CT in the memory 61. The step 3010 will be explained in detail hereinafter (see FIG. 16).

In the step 3020, referring to the power conversion unit DB 47 (see FIG. 11), the timer charge processing unit 41 decides whether the number PN power conversion units 9 are available or not (that is, units 9 without allocated) at the time zone from the connecting start time to the time when the charge time CT is added to the connecting start time. Then, if the power conversion units 9 are "completely not available", the timer charge processing unit 41 advances the process to the step 3045. If the power conversion units 9 are "partially available", the timer charge processing unit 41 advances the process to the step 3030. Further, if the power conversion units 9 are "available", the timer charge processing unit 41 advances the process to the step 3040.

In the step 3020, if the power conversion units 9 are decided as "partially available" (Step 3020: "partially available"), the timer charge processing unit 41 firstly allocates the power conversion units 9 available by the time when the number PN conversion units needed can be secured (Step 3030). That is, the timer charge processing unit 41 selects the available power conversion units 9. Then, the timer charge processing unit 41 sets the charge terminal No. as a power supply target to the respective selected power conversion units 9 by the time when the number PN or more power conversion units 9 can be secured from the connecting start time, in the power conversion unit DB 47 (see FIG. 11).

Then, the timer charge processing unit 41 allocates the power conversion units after the number PN power conversion units 9 are secured (Step 3035). That is, the timer charge processing unit 41 recalculates the number PN of the necessary power conversion units to achieve the charge rate specified by the user at the time zone form the time when the number PN or more power conversion units 9 can be secured to the charge end time specified by the user. Further, the timer charge processing unit 41 selects the PN number power conversion units 9 after the recalculation in the order so that the power conversion unit 9 with less operation time in the operation time DB is selected among the secured power conversion units 9. Further, the timer charge processing unit 41 sets the charge terminal No. as a power supply target to the respective selected power conversion units 9 from the time when the number PN or more power conversion units 9 can be secured to the time when the charge rate specified by the user can be achieved, in the power conversion unit DB 47 (see FIG. 11). Herein, if the specified charge rate is not satisfied, the timer charge processing unit 41 sets the charge terminal No. as a power supply target by the charge end time specified at the charge application time, in the power conversion unit DB 47 (see FIG. 11).

Here, it should be noted that the timer charge processing unit 41 may allocate the power conversion units 9 so as to conduct the charge operation after waiting the time when the number PN or more power conversion units 9 can be secured, instead of performing the processes in the steps 3030 and 3035. In such a case, the timer charge processing unit 41 recalculates the number PN of the necessary power conversion units at the time zone from the time when the number PN or more power conversion units 9 can be secured to the charge end time. Then, the timer charge processing unit 41 selects the PN number power conversion units 9 after the recalculation in the order so that the power conversion unit 9 with less operation time in the operation time DB is selected among the secured power conversion units 9. Further, the timer charge processing unit 41 sets the charge terminal No. as a power supply target to the respective selected power conversion units 9 from the time when the number PN or more power conversion units 9 can be secured to the time when the charge rate specified by the user can be achieved, in the power conversion unit DB 47 (see FIG. 11). By this construction, it is possible to avoid the necessity to increase the number of the power conversion units 9 used during the process, resulting in avoiding the complicated communication procedure.

In the step 3020, if the power conversion units 9 are decided as "available" (Step 3020: "available"), the timer charge processing unit 41 allocate the power conversion units 9 (Step 3040). That is, the timer charge processing unit 41 selects the number PN power conversion units 9 available in the order of the less operation time thereof in the operation time DB 48. Then, the timer charge processing unit 41 sets the charge terminal No. as a power supply to the selected respective conversion units 9 from the connecting start time to the time when the charge time CT is added to the connecting start time, in the power conversion unit DB 47 (see FIG. 11).

On the other hand, if the power conversion units 9 are decided as "completely not available" (Step 3020: "completely not available"), the timer charge processing unit 41 transmits a reply (or related information) notifying that all the power conversion units 9 are fully reserved by the charge end time specified by the user, into the charge terminal 118 through the vehicle communication control part 33 (Step 3045).

Figure 25:
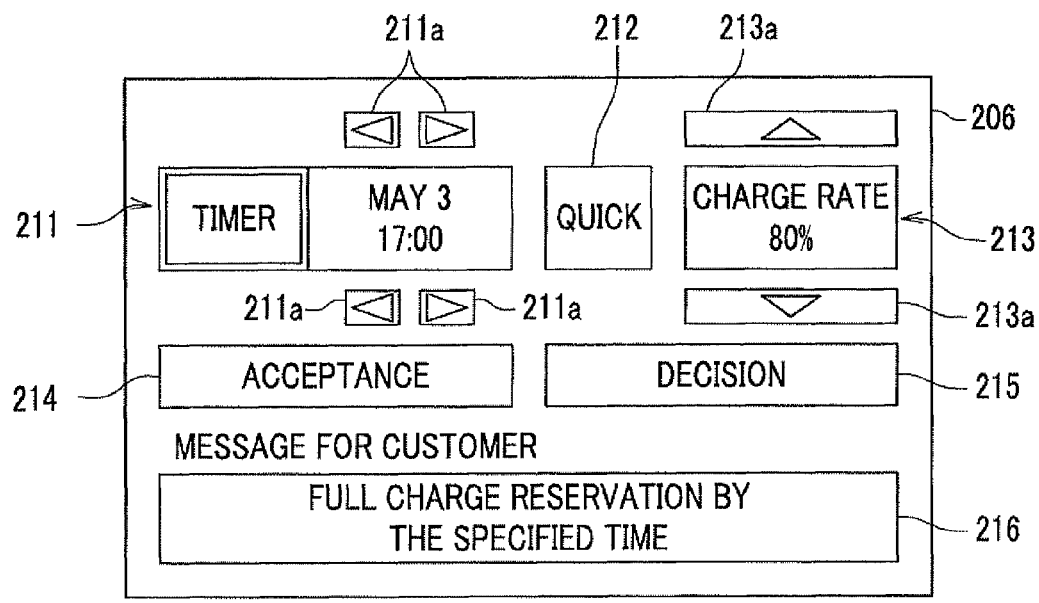
FIG. 25 is a diagram showing a charge reservation/message screen when receiving a reply indicating that the charge reservation is fully booked in the timer charge.

Herein, the charge appearance setting processing part 37 of the charge terminal 118 receives the above mentioned reply and stores it in the storage part 66 (see FIG. 8). Then, the charge appearance setting processing part 37 displays a charge reservation/message screen 206 on the acceptance and display part 65 as shown in FIG. 25. FIG. 25 shows a charge reservation/message screen when receiving a reply notifying that the charge reservation is fully booked in the timer charge. That is, the charge appearance setting processing part 37 displays a massage that the charge reservation is fully booked by the specified charge end time in the message display area 216.

In the step 3050, the timer charge processing part 41 sets the charge start time and the charge end time, which are indicated by setting the charge terminal 118 No. as a power supply to the respective power conversion units (A to E) in the power conversion unit DB 47, into the area of the timer charge management DB 45 after the power conversion unit 9 allocation (Step 3050).

Then, the timer charge processing part 41 calculates how many percents of the charge are completed at the charge end time, thereby to set the charge rate at the charge end time in the area of the timer charge management DB 45 after the power conversion unit allocation (step 3060).

Next, the timer charge processing part 41 transmits a reply (or related information) including a charge rate value at the charge end time in the area of the timer charge management DB 45 after the power conversion unit allocation, into the charge terminal 118 through the vehicle communication control part 33 (Step 3070).

Figure 26:
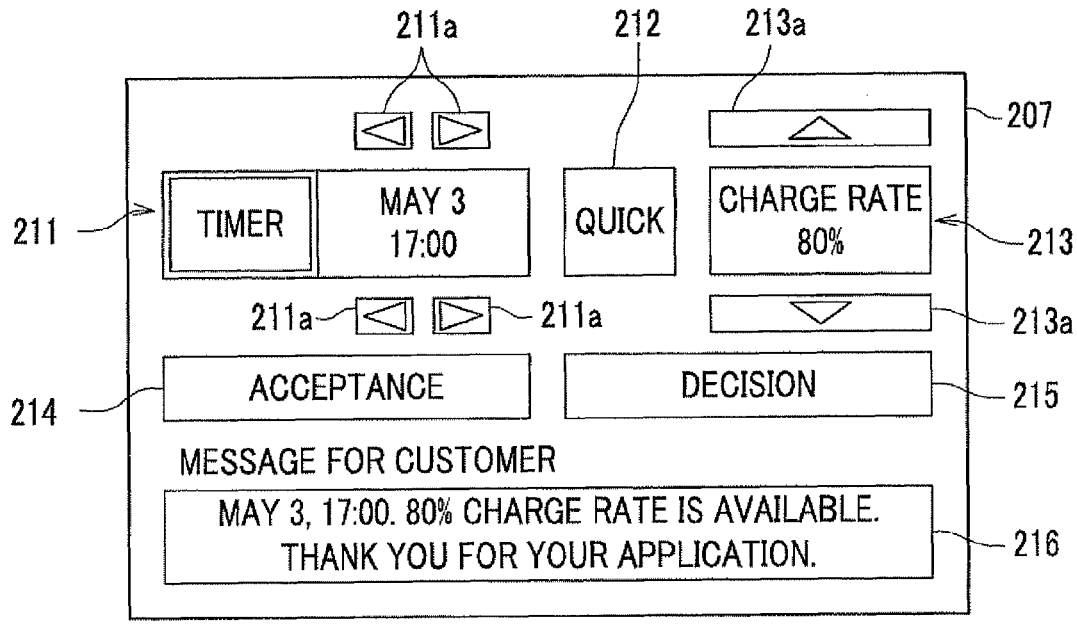
FIG. 26 is a diagram showing a charge reservation/message screen when receiving a reply indicating a charge rate at the end of the charging in the timer charge.

Herein, the charge appearance setting processing part 37 of the charge terminal 118 receives the reply and stores it in the storage part 66 (see FIG. 8). Then, based on the reply stored in the storage part 66, the charge appearance setting processing part 37 displays a charge reservation/message screen 207 shown in FIG. 26 on the acceptance and display part 65. FIG. 26 shows a charge reservation/message screen when receiving a reply including the charge rate value at the charge end time in the timer charge. That is, the charge appearance setting processing part 37 displays the massage including the charge rate value at the charge end time in the message display area 216. Note that the reply may include a scheduled charge end time as shown in FIG. 26.

Figure 16:
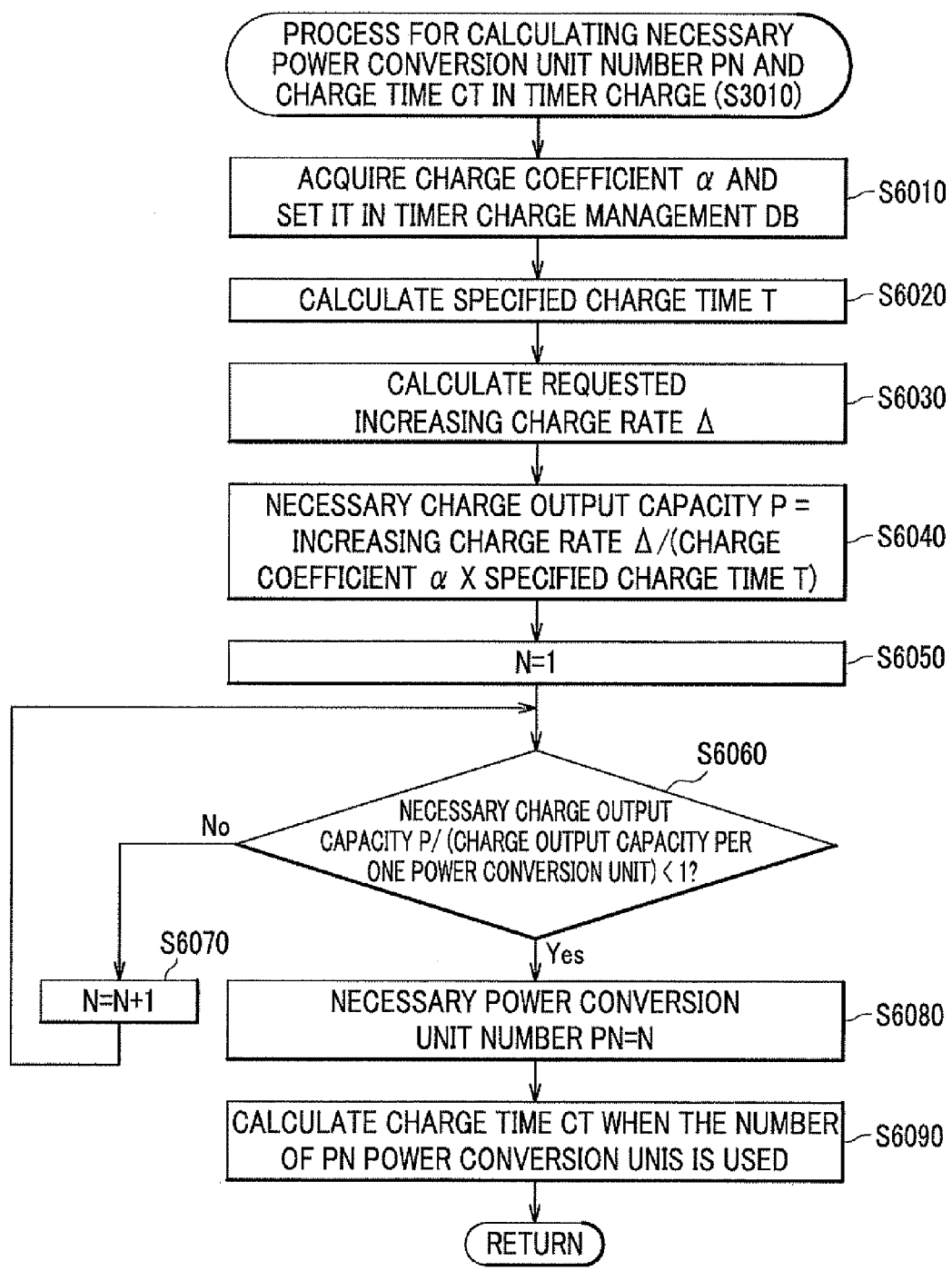
FIG. 16 is a flowchart showing a procedure of a calculation process of the necessary power conversion unit number PN and the charge time CT with respect to the timer charge.

Next, the calculation process of the necessary power conversion unit number PN and the charge time CT in the timer charge (Step 3010) will be explained referring to FIG. 16.

First, the timer charge processing part 41 acquires a charge coefficient α by communicating with the vehicle 102 through the charge terminal 118, thereby to set the data in the timer charge management DB 45 (Step 6010).

Then, the timer charge processing part 41 calculates the specified charge time T which is the time from the connecting start time to the charge end time specified by a user referring to the timer charge management DB 45 (Step 6020).

Next, the timer charge processing part 41 calculates the requested increasing charge rate Δ (Step 6030). Herein, the increasing charge rate Δ is calculated by the following equation:

"Increasing charge rate Δ"="Charge rate (%) at the charge end time shown in the area of the timer charge management DB 45 at the application time"−"Battery residual quantity (%) at the application time".

Herein, if the value of the increasing charge rate Δ is negative, it is possible to indicate to the user that the specified charge rate value is too small by displaying the message on the charge reservation/message screen so as to have the user input the charge rate again.

Then, the timer charge processing part 41 calculates the necessary charge output capacity P which is the supply power needed for completing the charge to achieve the charge rate specified by the user in the specified charge time zone, by using the charge coefficient α (Step 6040). Herein, the necessary charge output capacity P is calculated by the following equation:

Necessary charge output capacity P=Increasing charge rate Δ/(Charge coefficient α×Specified charge time T)

Then, after setting the valuable N as "1" (Step 6050), the timer charge processing part 41 determines whether the following relationship is satisfied or not (Step 6060): Necessary charge output capacity P/(Charge output capacity (or supply power) per single charge converter unit×N)≤1.

In the step 6070, the timer charge processing part 41 increments the valuable N by "1" (that is, N=N+1), and returns the process to the step 6060.

In the step 6080, the timer charge processing part 41 calculates the necessary power conversion unit number PN (that is, PN=N), which is the necessary number of the power conversion units 9 needed for completing the charge to achieve the charge rate specified by the user in the specified charge time zone. The necessary power conversion unit number PN is stored in the memory 61. Then, the timer charge processing part 41 sets the charge output capacity (kW) as the total power supplied from the PN power conversion units 9, in the area of the timer charge management DB 45 after the power conversion unit allocation.

For example, by supplying electric power with the charge output capacity (or supply power) of 20 kW for 80 min, the charge coefficient α of the vehicle 102, which can be charged by increasing the charge rate from 0% to 80%, is calculated as 0.05 as mentioned before. If the charging conducted by increasing the charge rate from 0% to 80% is achieved in the vehicle 102 for 40 min, the necessary charge output capacity P is calculated as follows: Necessary charge output capacity P=(80−0)/(0.05×40)=40 kW. Accordingly, only in the case that one power conversion unit 9 supplies 10 kW power and the number N is 4, the decision becomes "Yes" in the step 3060, whereby the necessary charge conversion unit number PN is decided to be 4 (that is, PN=4).

Then, the timer charge processing part 41 calculates the charge time CT if PN power conversion units are used (Step 6090). Herein, the charge time CT is calculated by the following equation: Charge time CT=Increasing charge rate Δ/(PN×Charge output capacity per one power conversion unit×Charge coefficient α).

Next, referring to FIG. 17, the allocation process of the power conversion units when the quick charge is applied (Step 2030) will be explained.

First, the quick charge processing part 42 acquires a charge coefficient α by communicating with the vehicle 102 through the charge terminal 118, and sets the value in the quick charge management DB 46 (Step 4010).

Then, the quick charge processing part 42 calculates the charge time QT in the quick charge by using the charge coefficient α, thereby to set the quick charge end time in the area of the quick charge management DB 46 at the application time (Step 4020).

Figure 18:
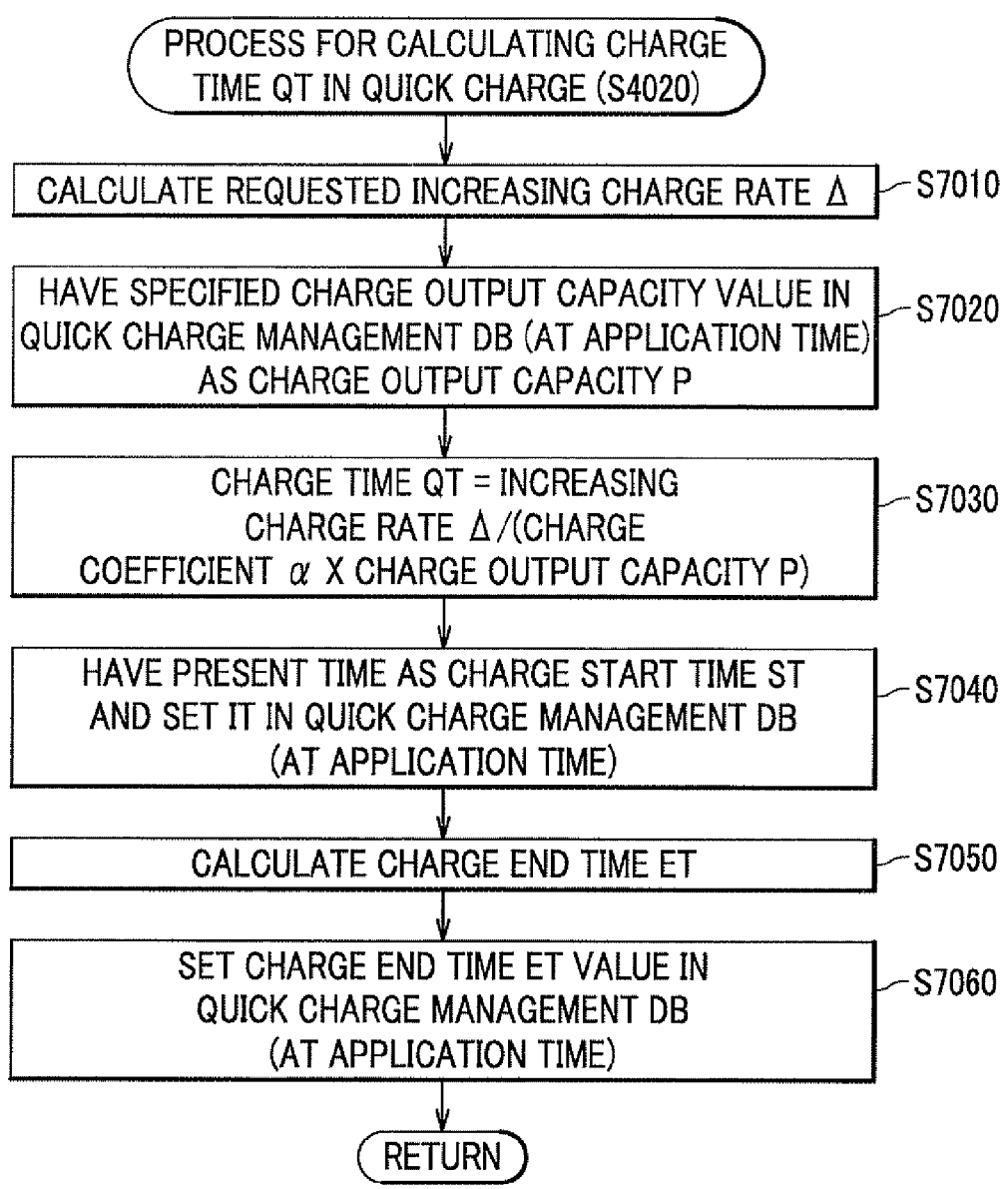
FIG. 18 is a flowchart showing a procedure of a calculation process of the charge time QT in the quick charge.

Next, the step 4020 will be explained in detail, referring to FIG. 18.

First, the quick charge processing part 42 calculates the requested increasing charge rate Δ (Step 7010). Herein, the increasing charge rate Δ is calculated by the following equation:

"Increasing charge rate Δ"="Charge rate (%) at the charge end time shown in the area of the quick charge management DB 46 at the application time"−"Battery residual quantity (%) at the application time".

The value of the increasing charge rate Δ is stored in the memory 61.

Herein, if the value of the increasing charge rate Δ is negative, it is possible to indicate to the user that the specified charge rate value is too small by displaying the message on the charge reservation/message screen so as to have the user input the charge rate again.

Then, the quick charge processing part 42 stores the value of the specified charge output capacity (kW) shown in the area of the quick charge management DB 46 at the application time as a charge output capacity P, in the memory 61 (Step 7020).

Then, the quick charge processing part 42 calculates a charge time QT (Step 7030). Herein, the charge time QT is calculated by the following equation: Charge time QT=Increasing charge rate Δ/(Charge coefficient α×Charge output capacity P).

Then, the quick charge processing part 42 stores the present time as a charge starting time ST in the memory 61, and sets the value of the charge starting time ST into the column of the charge starting time in the area of the quick charge management DB 46 at the application time (Step 7040).

Next, the quick charge processing part 42 calculates a charge end time ET (Step 7050). Herein, the charge end time ET is calculated by the following equation: Charge end time ET=Charge start time ST+Charge time QT.

Then, the quick charge processing part 42 sets the value of the charge end time ET into the column of the charge end time positioned in the area of the quick charge management DB 46 at the application time (Step 7060).

Figure 17:
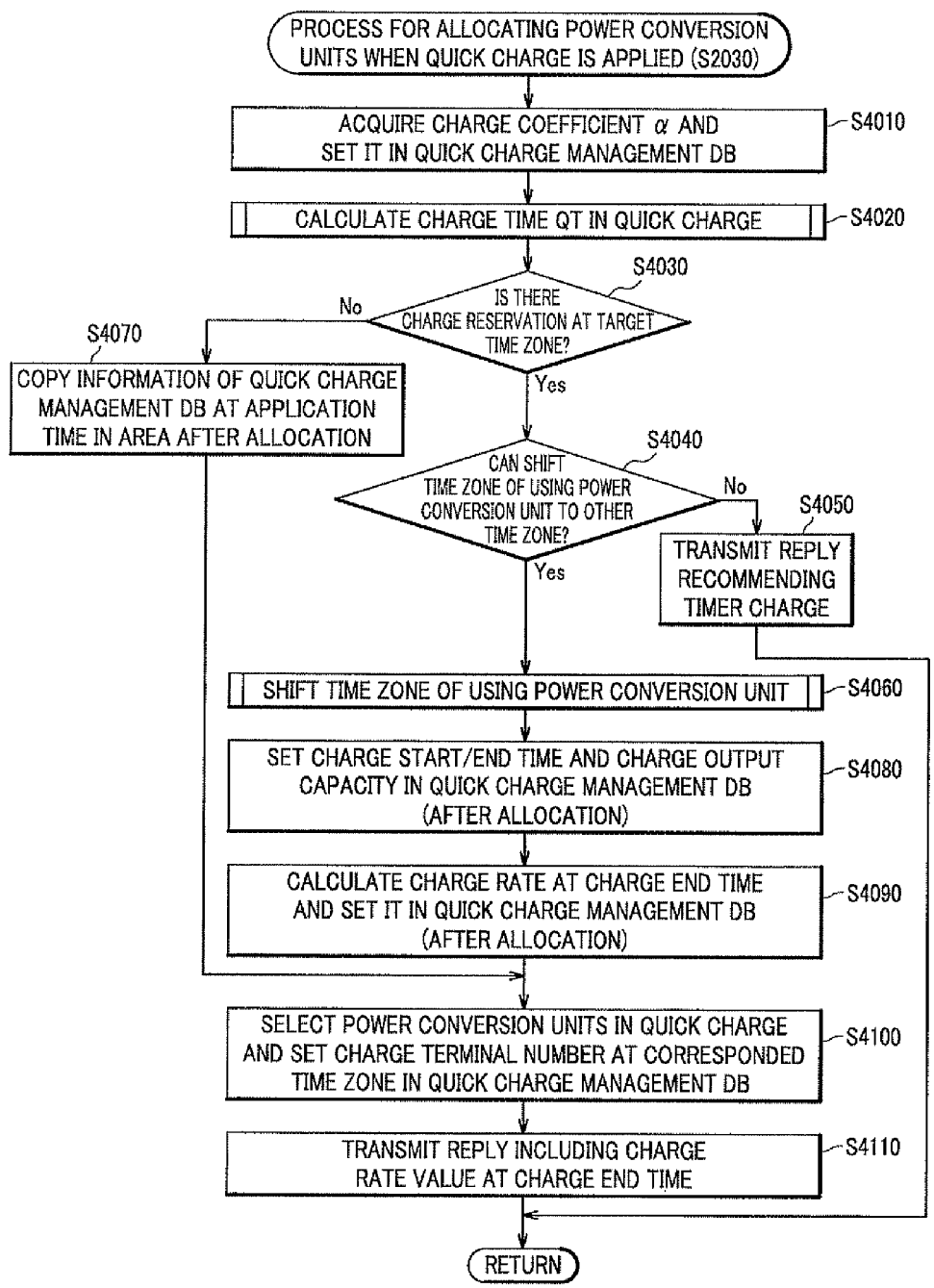
FIG. 17 is a flow chart showing an allocation process of the power conversion units when the quick charge is applied.

Here, returning to the step 4030 in FIG. 17, the quick charge processing part 42 determines whether a charge reservation is booked or not at the target time zone from the charge starting time ST to the charge end time ET. That is, the quick charge processing part 42 determines whether the value except for the initial value "0" is inputted or not in the target time zone, referring to the power conversion unit DB 47 (see FIG. 11). If the charge reservation is booked in the target time zone (Step 4030; Yes), the quick charge processing part 42 advances the process to the step 4040, while when no charge reservation is booked in the target time zone (Step 4030; No), the quick charge processing part 42 advances the process to the step 4070.

In the step 4070, the quick charge processing part 42 copies the data in the area of the quick charge management DB 46 at the application time and sets the data into the corresponding columns in the area after the power conversion unit allocation. Then, the quick charge processing part 42 advances the process to the step 4100.

In the step 4040, the quick charge processing part 42 specifies the charge terminal 118 occupying the power conversion units 9 in the target time zone referring to the power conversion unit DB 47 (that is, by the charge terminal No.). Then, the quick charge processing part 42 determines whether the using time of the power conversion unit 9 connected with the specified charge terminal 118 can be shifted to other time zone or not, referring to the timer charge management DB 45 (see FIG. 9).

If the quick charge processing part 42 decides that it is not possible to shift each using time of all power conversion units 9 (Step 4040; No), the quick charge processing part 42 advances the process to the step 4050. In contrast, if the quick charge processing part 42 decides that it is possible to shift each using time of all or a part of the power conversion units 9 (Step 4040; Yes), the quick charge processing part 42 advances the process to the step 4060.

In the step 4050, the quick charge processing part 42 transmits a reply recommending the timer charge (or related information) into the charge terminal 118 through the vehicle communication control part 33.

Figure 27:
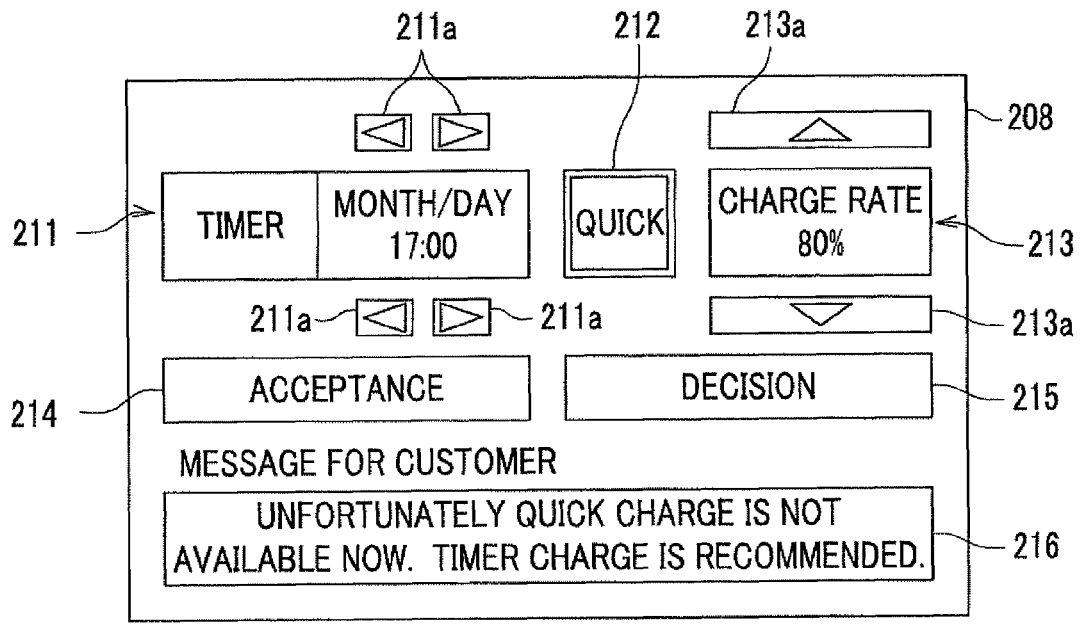
FIG. 27 is a diagram showing a charge reservation/message screen when receiving a reply recommending the timer charge.

Here, the charge appearance setting processing part 37 of the charge terminal 118 receives the above mentioned reply and stores it in the storage part 66 (see FIG. 8). Then, the charge appearance setting processing part 37 displays a charge reservation/message screen 208 shown in FIG. 27 on the acceptance and display part 65 based on the reply stored in the storage part 66. FIG. 27 shows a charge reservation/message screen when receiving a reply recommending the timer charge. That is, the charge appearance setting processing part 37 displays a message recommending the timer charge in the message display area 216.

In the step 4060, the quick charge processing part 42 performs a shift process of the using time of the power conversion unit. Herein, the charge terminal No. is reset in the power conversion unit DB 47 (see FIG. 11).

Figure 19:
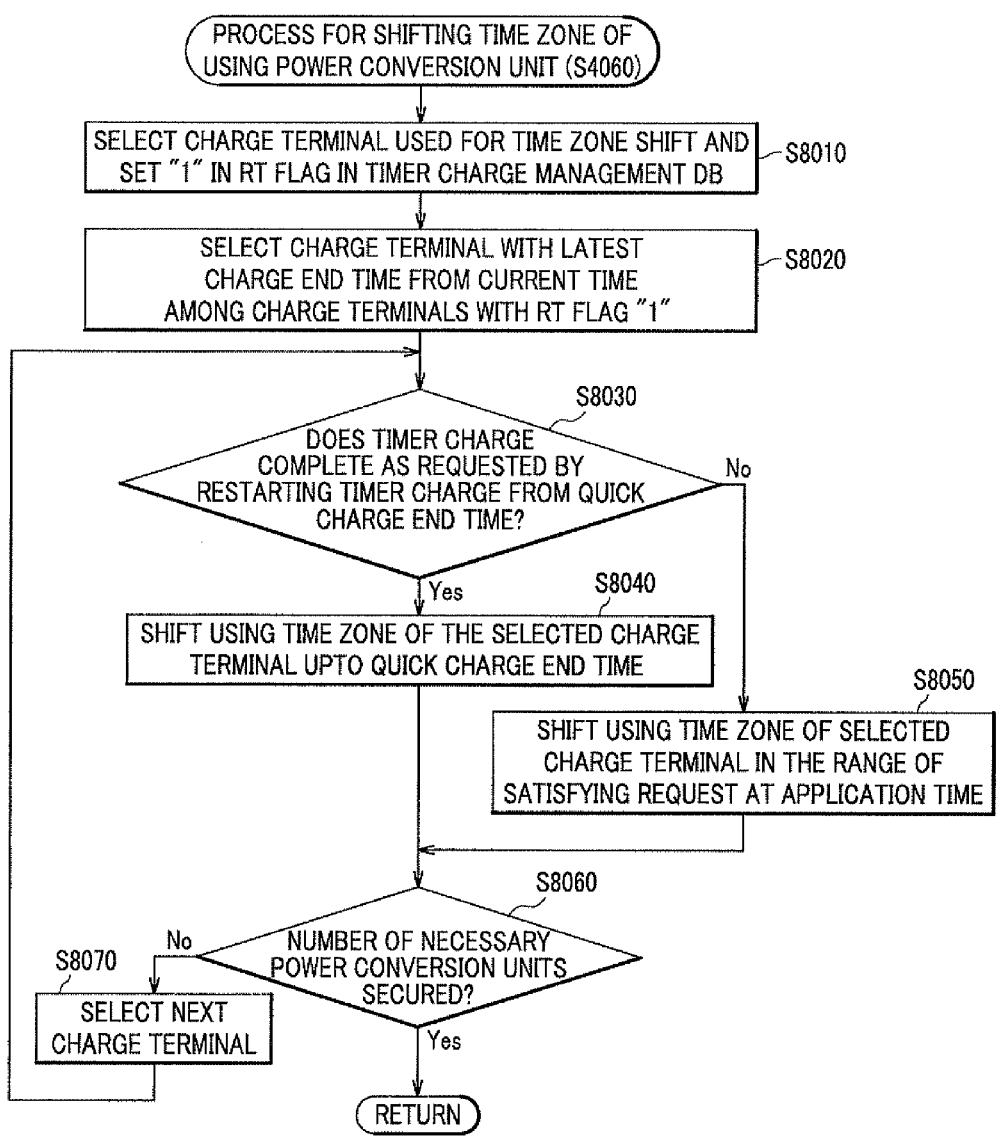
FIG. 19 is a flowchart showing a procedure of a shift process of the using time of the power conversion unit.

Next, the step 4060 will be explained in detail, referring to FIG. 19.

First, the quick charge processing part 42 selects the charge terminal 118, which can be a target for shifting the using time thereof, and sets "1" in the corresponding RT flag of the timer charge management DB 45, referring to the power conversion unit DB 47 (see FIG. 11) and the timer charge management DB 45 (see FIG. 9) (Step 8010). More specifically, referring to the charge end time in the timer charge management DB 45 (at the application time) and the time zone in which the corresponding charge terminal No. in the power conversion unit DB 47 is set, if there is a difference in the time more than the predetermined time (for example, about 15 min), "1" is set in the RT flag. This allows the charge terminal 118 to be selected having the available time more than the predetermined time, even if the using time of the power conversion unit is shifted.

Next, the quick charge processing part 42 selects the charge terminal 118 of which charge end time is most apart from the present time among the charge terminals 118 with the RT flag of "1" in the timer charge management DB 45 (see FIG. 9)

(Step 8020). Herein, the charge end time is the time indicated in the power conversion unit DB 47 (see FIG. 11).

In the step 8030, the quick charge processing part 42 determines whether the timer charge at the selected target charge terminal 118 is completed or not by the specified charge end time requested by the user, even by restarting the timer charge from the charge end time (14:00 in FIG. 10) listed in the area of the quick charge management DB 46 (see FIG. 10) at the application time, referring to the timer charge management DB 45. If the quick charge processing part 42 decides that the charge at the target charge terminal 118 is completed as requested (Step 8030; Yes), the quick charge processing part 42 advances the process to the step 8040. In contrast, if the quick charge processing part 42 decides that the charge at the target charge terminal 118 is not completed as requested (Step 8030; No), the quick charge processing part 42 advances the process to the step 8050.

In the step 8040, the quick charge processing part 42 shifts the using time of the target charge terminal 118 from the present time to the quick charge end time. That is, the quick charge processing part 42 shifts the using time of the power conversion unit 9, by shifting the setting position of the charge terminal No. in the power conversion unit DB 47 so that the charge rate when the timer charge is applied is satisfied for the target charge terminal 118. Then, the quick charge processing part 42 sets the charge start/end time after the shift process of the using time into the area of the timer charge management DB 45 (see FIG. 9) after the allocation of the power charge units, for the target charge terminal 118.

In the step 8050, the quick charge processing part 42 shifts the using time for the target charge terminal 118 in the range for satisfying the request at the application time. That is, the quick charge processing part 42 shifts the using time of the power conversion unit 9, by shifting the setting position of the charge terminal No. in the power conversion unit DB 47, within the range for satisfying the charge end time and the charge rate when the timer charge is applied, for the target charge terminal 118. In such a case, the charge end time when the timer charge is applied becomes the charge end time after the allocation of the power conversion unit. Then, the quick charge processing part 42 sets the charge start/end time after the shift process of the using time into the area of the timer charge management DB 45 (see FIG. 9) after the allocation of the power conversion units, for the target charge terminal 118. Herein, when the using time of the power conversion unit 9 is shifted, the necessary power conversion unit number PN may be recalculated so as to achieve the charge rate specified by the user. This allows the reallocation of the power conversion units, which results in the increase of the probability of the case that the using time can be shifted from the present time to the quick charge end time.

In the step 8060, the quick charge processing part 42 determines whether the number of the power conversion units capable of satisfying the specified charge output capacity needed at the quick charge start time is secured or not. Here, the decision is made considering the power conversion units 9 which are not scheduled to be used (for example, charge conversion unit E in FIGS. 13C to 13D). If the quick charge processing part 42 decides that the necessary number of the power conversion units is secured (Step 8060; Yes), the quick charge processing part 42 advances the process to the step 4080 (see FIG. 17), while the quick charge processing part 42 decides that the necessary number of the power conversion units is not secured (Step 8060; No), the quick charge processing part 42 advances the process to the step 8070.

In the step 8070, the quick charge processing part 42 selects a charge terminal 118 of which charge end time is secondly apart from the present time among the charge terminals 118 with the RT flag "1" in the timer charge management DB 45 (see FIG. 9), then returns the process to the step 8030. Herein, if there is no charge terminal 118 to be selected next in the step 8070, the quick charge processing part 42 advances the process to the step 4080 (see FIG. 17).

Returning to the step 4080 in FIG. 17, the quick charge processing part 42 sets the time zone available for the quick charge (that is, the charge start/end time) and the charge output capacity into the area of the quick charge management DB 46 (see FIG. 10) after allocation of the power conversion units, for the charge terminal 118 received the application of the quick charge (Step 4080).

Then, the quick charge processing part 42 calculates how many percentages of the charge (or charge rate) at the charge end time are completed, and sets the charge rate at the charge end time into the area of the quick charge management DB 46 (see FIG. 10) after allocation of the power conversion units (Step 4090).

Then, the quick charge processing part 42 selects the charge conversion unit to be used for the quick charge, and sets the charge terminal No. of the charge terminal 118 receiving the application of the quick charge, by adding "S" at the top of the charge terminal No., into the corresponding time zone in the power conversion unit DB 47 (Step 4100). Here, the available power conversion units are selected in the order of the less operation time in the operation time DB (see FIG. 12), if the decision is "No" in the step 4030, based on the information (or charge output capacity) in the area of the quick charge management DB 46 after the allocation of the power conversion units.

Then, the quick charge processing part 42 transmits a reply (or related information) including the charge rate value in the area of the quick charge management DB 46 after the allocation of the power conversion units, into the charge terminal 118 through the vehicle communication control part 33 (Step 4110).

Figure 28:
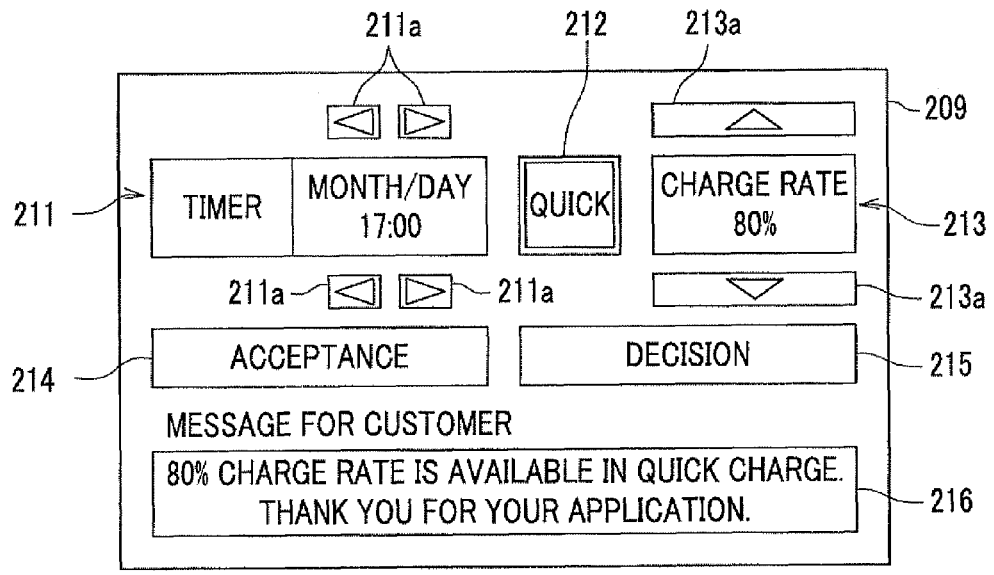
FIG. 28 is a diagram showing a charge reservation/message screen when receiving a reply indicating a charge rate at the end of the charging in the quick charge.

Here, the charge appearance setting processing part 37 of the charge terminal 118 receives the above mentioned reply and stores it in the storage part 66 (see FIG. 8). Then, the charge appearance setting processing part 37 displays a charge reservation/message screen 209 shown in FIG. 28 on the acceptance and display part 65 based on the reply stored in the storage part 66. FIG. 28 shows a charge reservation/message screen when receiving a reply including the charge rate value at the charge end time in the quick charge. That is, the charge appearance setting processing part 37 displays the message including the charge rate value at the charge end time in the quick charge in the message display area 216. Note the information on the scheduled charge end time and the charge output capacity or the like may be included in the message display area 216 of FIG. 28.

As mentioned before, the charging equipment 103 of the second embodiment comprises the power output part 110 which outputs DC power used for charging, the plurality of user operation units 107 capable of being connected with the vehicle 102 as a device mounted with battery; the device being equipped with the battery 4, and the charge control unit 155 which controls the power supplied from the power output part 110 to the user operation unit 107. That is, the charging equipment 103 supplies electric power to the battery 4 for the charging thereof. The charge control unit 155 distributes the power outputted from the power output part 110 and supplies the distributed power to the user operation unit 107 connected with the vehicle 102.

According to the second embodiment, when the vehicle 102 as a device mounted with battery is connected with the user operation unit 107 of the charging equipment 103, the charge control unit 155 distributes the power available at that time to the user operation unit 107 as a power supply and supplies the distributed power to the user operation unit 107 for charging the battery 4 of the vehicle 102. Then, every time when the vehicle 102 is connected with the user operation unit 107, the power available at that time is allocated to the user operation unit 107, to charge the battery 4. Accordingly, the single charging equipment 103 can perform the charge operation for the plurality of user operation units 107, allowing the plurality of vehicles 102 to be simultaneously charged.

Further, in the second embodiment, the power output part 110 includes a plurality of power conversion units 9. Hereby, the charge control unit 155 supplies the power outputted at least one power conversion unit 9 selected from the plurality of power conversion units 9, to the user operation unit 107 connected with the vehicle 102.

According to the above mentioned construction, it is possible to stop only the operation of the power conversion unit in which maintenance is scheduled, and to use other power conversion units for charging. Accordingly, with keeping the operation of the charging equipment 103, the maintenance of the power conversion unit 9 may be performed. Further, if the number of users of the charging equipment 103 increases, it is possible to correspond to the increase by arranging additional power conversion units 9. As a result, this allows the number of the power conversion units 9 to be changed corresponding to the number of users, resulting in the saving of the initial costs needed for the charging equipment 103.

Further, in the second embodiment, the power output part 110 converts electric power from the system 5 to DC power used for charging, and outputs the DC power. This allows DC power needed for charging to be easily obtained by using a commercial power source.

Further, in the second embodiment, a charge pattern set by a user through the user operation unit 107 is acquired, and based on the charge pattern, the power outputted from the power output part 110 is distributed. This allows the battery 4 to be charged by the charge pattern corresponding to a request from the user. Accordingly, it is possible to provide flexible services corresponding to the request from the user.

Further, in the second embodiment, when the charge pattern is received, the distribution of the power outputted from the power output part 110 is controlled, based on the already set charge pattern. This allows the optimal charge operation to be conducted corresponding to the situation at each time, by considering if the user is in haste or not.

Further, in the second embodiment, the charge pattern includes a charge schedule which defines a charge end time of the battery 4, and the charge control unit 155 distributes the power outputted from the power output part 110 so that the charge schedule is satisfied. This allows the charge operation to be conducted so as to complete the charge by the time specified by the user.

Further, in the second embodiment, the charge pattern includes a quick charge request which requests to immediately conduct the charge with the predetermined charge output capacity of the battery 4, and the charge control unit 155 distributes the power outputted from the power output part 110 so that the quick charge request is satisfied. This allows the quick charge to be completed in time, even if the user is in haste.

Further, in the second embodiment, the charge pattern includes a value of the charge rate or charge amount of the battery 4, and the charge control unit 155 distributes the power outputted from the power output part 110 so that the charge rate or charge amount is satisfied. This allows the charge operation to be conducted corresponding to the charge rate or charge amount requested by the user.

Further, in the second embodiment, a charge coefficient $\alpha$ which represents the increase of the charge rate or charge amount when the battery 4 is charged per unit time with the unit charge output capacity or the information by which the charge coefficient $\alpha$ can be calculated, is acquired from the vehicle 102 through the user operation unit 107. Hereby, the distribution of the power is controlled based on the charge coefficient $\alpha$. This allows the time when the charge rate or charge amount requested by the user is achieved to be more accurately calculated.

Further, the second embodiment is a method of receiving charge executed by the user operation unit 107 of the charging equipment 103. Herein, the method comprises steps of: (a) displaying the charge reservation/message screen (201 to 209) as an acceptance screen on the acceptance and display part 65 comprising the timer charge acceptance part 211 which accepts a charge schedule defining a charge end time of the battery 4 and the quick charge acceptance part 212 which accepts a quick charge request requesting an immediate execution of charging with a predetermined charge output capacity of the battery 4, (b) receiving information on the charge schedule or the quick charge request on the charge reservation/message screen (201 to 209), (c) storing the information on the charge schedule or the quick charge request received in the step (b) in the storage part 66, and (d) transmitting the information on the charge schedule or the quick charge request stored in the storage part 66 into the charge control unit 155.

By using the above mentioned construction, the plurality of the user operation units 107 can be used for charging by the single charging equipment 103. Accordingly, by using the plurality of user operation units 107 in the charging equipment 103 capable of simultaneously charging the plurality of vehicles 102, a user can easily request a timer charge or a quick charge through the charge reservation/message screen (201 to 209) having the timer charge acceptance part 211 and the quick charge acceptance part 212 displayed on the acceptance and display part 65.

Further, in the second embodiment, the method of receiving charge further comprises steps of: (e) receiving the information on the reply which responds to the charge schedule or quick charge request from the charge control unit 155, (f) storing the information on the reply which is received in the step (e) into the storage part 66, and (g) displaying the message of the reply on the acceptance and display part 65 based on the information on the reply stored in the storage part 66. This allows the reply responding to the charge schedule or quick charge request to be displayed on the acceptance and display part 65, which facilitates the user to confirm the reservation content and change the reservation content if needed, resulting in the achievement of the highly feasible convenience.

Further, in the second embodiment, the charge reservation/message screen (201 to 209) comprises the charge target acceptance part 213 which accepts a value of the charge rate of the battery 4. This allows a user to easily specify a wished charge value on the charge reservation/message screen (201 to 209).

Hereinbefore, the first and second embodiments of the present invention have been explained. Herein, the present invention is not limited to the constructions described in the embodiments, and the modification thereof can be conducted within the scope of the present invention, for example, by preferably combining or selecting the constructions in the respective embodiments.

For example, in the second embodiment, is explained the case in which the charge control unit 155 is included in the charge converter device 106. However, the present invention is not limited to the case. In the present invention, at least a part of the charge control device 132 of the charge control unit 155 is included in the server computer (not shown) connected with the host communication control part 51 through a network for performing communication.

Figure 29:
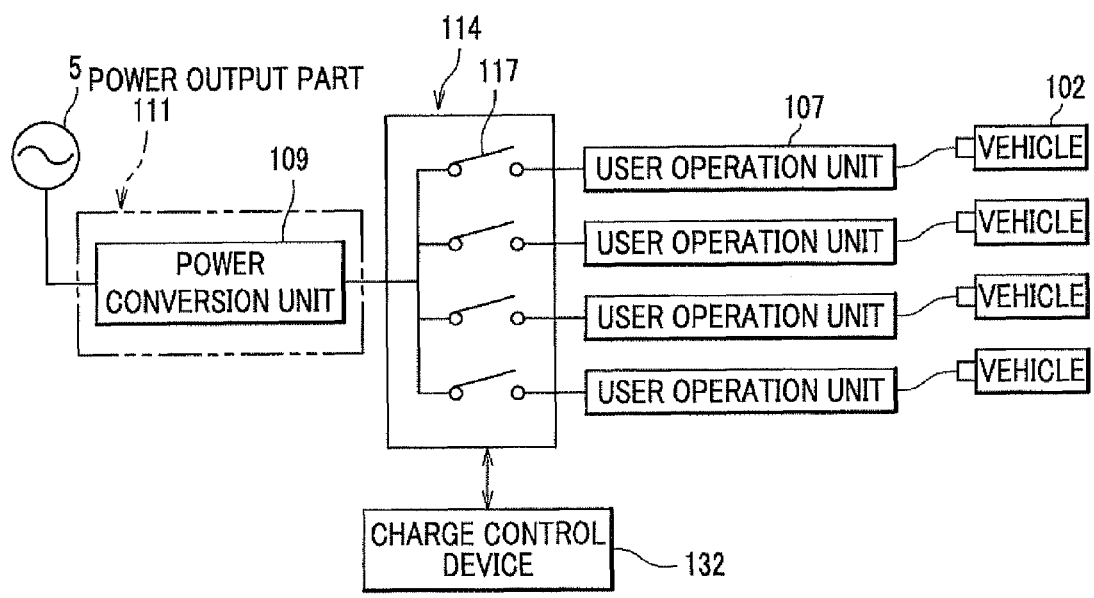
FIG. 29 is a block diagram showing a modified example in the second embodiment.
Figure 30:
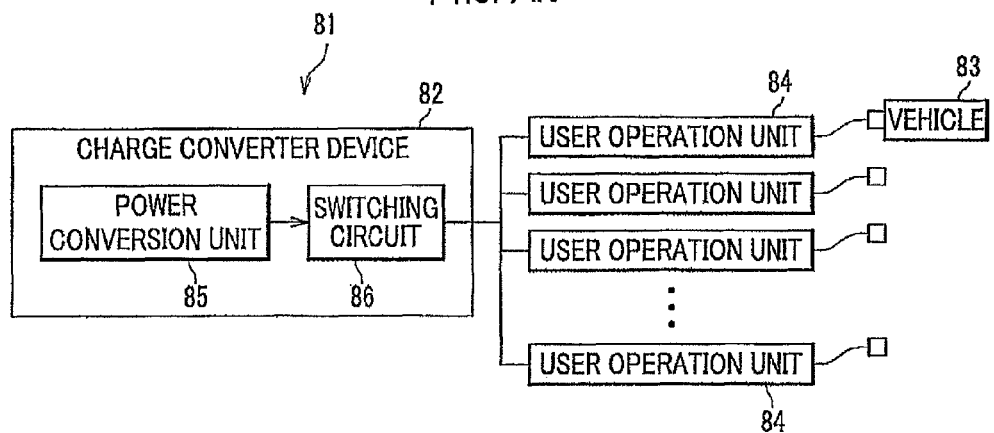
FIG. 30 is a block diagram showing conventional charging equipment.

Further, in the second embodiment, is explained the case in which the power output part 110 comprises the plurality of power conversion units 9. However, the present invention is not limited to the case. FIG. 29 is a block diagram showing the important part of the modified example of the second embodiment. As shown in FIG. 29, the present invention may include a case in which the power output part 111 includes only a single power conversion unit 109. In such a case, the power outputted from the single power conversion unit 109 is distributed by a distributer 114 to supply the distributed power to the user operation unit 107 connected with the vehicle 102. The distributer 114 comprises a plurality of switches 117 each having equivalent variable resistance using a switching device for connecting the power conversion unit 109 with each user operation unit 107. The charge control device 132 can distribute the power from the power conversion unit 109 in an optional rate to supply the distributed power to each user operation unit 107, by controlling the respective switches 117.

Further, in the second embodiment, is explained the case in which the power output part 110 converts the power from the system 5 to the DC power used for charging and outputs the DC power. However, the present invention is not limited to the case. For example, the power output part 110 may comprise rechargeable batteries, and the DC power used for charging may be outputted from the rechargeable batteries. In such a case, a fuel cell battery and a solar light battery or the like may be used for charging the rechargeable batteries.

Further, in the second embodiment, is explained the case in which the timer charge acceptance part 211 accepts the specified charge end time. However, the present invention is not limited to the case. For example, the timer charge acceptance part 211 may accept the specified time from the present time (for example, 60 min).

Further, in the second embodiment, is explained the case in which the charge target acceptance part 213 accepts the specified charge rate value (%) of the battery 4. However, the present invention is not limited to the case. For example, the timer charge acceptance part 213 may accept the specified charge amount value (kW) of the battery 4. Further, the specified charge rate value (%) or the specified charge amount value (kW) may be the value after completing the charge, or the additional value from the value at the application time.

Further, in the second embodiment, is explained the case in which the device mounted with battery is the vehicle 102 such as an electric automobile and a hybrid vehicle. However, the present invention is not limited to the case. For example, the device mounted with battery may be an automatic transporter, a fork lift, a robot, a visitor cart, a motorcycle or a bus, as described in the first embodiment.

Further, in the second embodiment, is explained the case in which the processing shown in FIGS. 14 to 19 is software like processing using programs, while hardware like processing may be used in which ASIC (Application Specific Integrated Circuit: IC for specified application) is used.

What is claimed is:

1. A charge control unit included in charging equipment which charges a battery by supplying electric power thereto, the charging equipment comprising:
    a power output part which outputs DC power used for charging, and which comprises a plurality of power conversion units;
    a plurality of user operation units capable of being connected with a device mounted with the battery;
    the charge control unit which controls a power supply from the power output part to the user operation unit; and
    a switching circuit which changes a connecting combination between the power conversion units and the user operation units,
    wherein the charge control unit is configured to distribute the electric power outputted from at least one of the power conversion units selected from the plurality of power conversion units via the switching circuit to supply the distributed power to the user operation unit connected with the device mounted with the battery, and
    wherein the charge control unit is configured to acquire information on a time zone of peak electric power from the outside of the charging equipment, and to select the predetermined number of the charge conversion units in the order of a longer operation time from the plurality of power conversion units, so as to restrict the operation of the selected power conversion units during the time zone of the peak electric power.

2. The charge control unit described in claim 1, wherein the power output part is configured to convert electric power from a system to DC power used for charging and to output the DC power.

3. The charge control unit described in claim 1, wherein the charge control unit is configured to acquire a charge pattern set by a user at the user operation unit, and to distribute the electric power outputted from the power output part based on the charge pattern.

4. The charge control unit described in claim 3, wherein, when the charge control unit acquires the charge pattern, the charge control unit is configured to arrange distribution of the electric power outputted from the power output part based on the charge pattern already set.

5. The charge control unit described in claim 3, wherein the charge pattern contains a charge schedule which defines a charge end time of the battery, and the charge control unit is configured to distribute the electric power outputted from the power output part so that the charge schedule is satisfied.

6. The charge control unit described in claim 3, wherein the charge pattern contains a quick charge request which requests to immediately conduct the charge with a predetermined charge output capacity of the battery, and the charge control unit is configured to distribute the electric power outputted from the power output part so that the quick charge request is satisfied.

7. The charge control unit described in claim 3, wherein the charge pattern contains a charge rate or a charge amount of the battery, and the charge control unit is configured to distribute the electric power outputted from the power output part so that the charge rate or the charge amount is satisfied.

8. The charge control unit described in claim 1, wherein the charge control unit is configured to acquire a charge coefficient which represents a charge rate or an increase of a charge amount if the battery is charged by unit time with a unit charge output capacity, or information by which the charge coefficient is calculated, from the device mounted with battery through the user operation unit, so as to control the power distribution by using the charge coefficient.

9. The charge control unit described in claim 8, wherein the charge coefficient or the information by which the charge coefficient is calculated, is updated based on a result obtained by measuring a performance of the battery in the device mounted with battery.

10. Charging equipment comprising:
a power output part which outputs DC power used for charging and which comprises a plurality of power conversion units;
a plurality of user operation units capable of being connected with a device mounted with a battery;
a charge control unit which controls a power supply from the power output part to the user operation unit, to charge the battery by supplying electric power thereto, and
a switching circuit which changes a connecting combination between the power conversion units and the user operation units, wherein
the charge control unit is configured to distribute the electric power outputted from at least one of the power conversion units selected from the plurality of power conversion units via the switching circuit to supply the distributed power to the user operation unit connected with the device mounted with the battery, and
wherein the charge control unit is configured to acquire information on a time zone of peak electric power from the outside of the charging equipment, and to select the predetermined number of the charge conversion units in the order of a longer operation time from the plurality of power conversion units, so as to restrict the operation of the selected power conversion units during the time zone of the peak electric power.

11. A method of controlling charge which is executed by a charge control unit included in charging equipment: the charging equipment comprising:
a power output part which outputs DC power used for charging and which comprises a plurality of power conversion units; a plurality of user operation units capable of being connected with a device mounted with a battery; a charge control unit which controls a power supply from the power output part to the user operation unit; and a switching circuit which changes a connecting combination between the power conversion units and the user operation units,
wherein the charge control unit is configured to acquire information on a time zone of peak electric power from the outside of the charging equipment, and to select the predetermined number of the charge conversion units in the order of a longer operation time from the plurality of power conversion units, so as to restrict the operation of the selected power conversion units during the time zone of the peak electric power,
the method comprising the steps of:
changing a switching state of the switching circuit based on necessary electric energy information outputted from the device mounted with the battery;
distributing the electric power outputted from at least one of the power conversion units selected from the plurality of power conversion units via the switching circuit;
supplying the distributed power to the user operation unit connected with the device mounted with battery; and
charging the battery by supplying electric power thereto.

12. A method of receiving charge which is executed by a user operation unit included in charging equipment, the charge equipment comprising a power output part which outputs DC power used for charging, a plurality of user operation units capable of being connected with a device mounted with a battery; and a charge control unit which controls a power supply from the power output part to the user operation unit, to charge the battery by supplying electric power thereto,
wherein the charge control unit is configured to distribute the electric power outputted from the power output part to supply the distributed power to the user operation unit connected with the device mounted with the battery, and
wherein the charge control unit is configured to acquire information on a time zone of peak electric power from the outside of the charging equipment, and to select the predetermined number of the charge conversion units in the order of a longer operation time from the plurality of power conversion units, so as to restrict the operation of the selected power conversion units during the time zone of the peak electric power,
the method executed by the user operation unit comprising steps of:
(a) displaying an acceptance screen on a display part comprising a timer charge acceptance part which accepts a charge schedule determining a charge end time of the battery and a quick charge acceptance part which accepts a quick charge request requesting an immediate execution of charging with a predetermined charge output capacity of the battery,
(b) receiving information on the charge schedule or the quick charge request on the acceptance screen,
(c) storing the information on the charge schedule or the quick charge request received in the step (b) in a storage part of the user operation unit, and
(d) transmitting the information on the charge schedule or the quick charge request stored in the storage part to the charge control unit.

13. The method of receiving charge described in claim 12, further comprising steps of:
(e) receiving information on a reply which responds to the charge schedule or the quick charge request from the charge control unit,
(f) storing the information on the reply which is received in the step (e) into the storage part, and
(g) displaying a message of the reply on the display part based on the information on the reply stored in the storage part.

14. The method of receiving charge described in claim 12 or claim 13, wherein the acceptance screen comprises a charge target acceptance part which accepts a value of a charge rate or a charge amount of the battery.

15. Charging equipment for connecting a device mounted with battery thereto; the device being equipped with a battery, to charge the battery by supplying electric power to the battery,
the charging equipment comprising:
a plurality of power conversion units which convert electric power from a system to DC power and output the DC power,
a plurality of user operation units each of which has a charge cable connected with the device mounted with a battery,
a charge control unit which determines which power conversion unit is to be used from the plurality of the power conversion units, and based on the determination, connects the user operation unit with the power conversion unit, so as to control to start and stop a power supply from the power conversion unit to the user operation unit, for the user operation unit to be used by connecting the charge cable with the device mounted with the battery,
a fault detection means which detects a fault in the power conversion unit, and
a separation means which separates the power conversion unit with a fault from a state being used, wherein the charge control unit is configured to acquire information on a time zone of peak electric power from the outside of the charging equipment, and to select the predetermined number of the charge conversion units in the order of a longer operation time from the plurality of power conversion units, so as to restrict the operation of the selected power conversion units during the time zone of the peak electric power.

16. The charging equipment described in claim 15, wherein, when another device mounted with battery is to be charged during a time when one device mounted with the battery is being charged, the charge control unit is configured to allocate the power conversion unit that is not being used, to the device mounted with the battery to be charged as a power supply.

17. The charging equipment described in claim 15, wherein the charging equipment comprises a necessary electric energy acquiring means which acquires necessary electric energy information from the device mounted with battery, as notice on electric power needed for charging, and the charge control unit allocates the power conversion units based on the necessary electric energy information inputted from the device mounted with battery, before starting charge.

18. The charging equipment described in claim 15, wherein the charge control unit dynamically changes or rearranges a connecting combination between the power conversion unit and the user operation unit corresponding to the charge state at that time.

19. The charging equipment described in claim 15, comprising a charge amount acquiring means which acquires charge amount information on the battery from the device mounted with battery, when the battery is charged, wherein the charge control unit changes allocation of the power conversion units corresponding to the charge amount of the battery.

20. The charging equipment described in claim 15, wherein the charging equipment comprises a charge pattern input means by which a charge pattern requested by a user is manually set through the user operation unit, and the charge control unit allocates the charge conversion units based on the charge pattern set by the user, before starting charge.

* * * * *